(12) United States Patent
Tsai et al.

(10) Patent No.: US 8,154,807 B2
(45) Date of Patent: Apr. 10, 2012

(54) IMAGING LENS ASSEMBLY

(75) Inventors: Tsung Han Tsai, Taichung (TW); Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 174 days.

(21) Appl. No.: 12/823,940

(22) Filed: Jun. 25, 2010

(65) Prior Publication Data

US 2010/0259838 A1    Oct. 14, 2010

(30) Foreign Application Priority Data

Mar. 9, 2010    (TW) ............................... 99106717 A

(51) Int. Cl.
G02B 13/18    (2006.01)
G02B 3/02    (2006.01)
G02B 9/12    (2006.01)

(52) U.S. Cl. ........................................ 359/716; 359/784
(58) Field of Classification Search .................. 359/716, 359/784, 789
See application file for complete search history.

(56) References Cited

U.S. PATENT DOCUMENTS

| 7,436,603 | B2 | 10/2008 | Huang et al. |
| 7,525,741 | B1 | 4/2009 | Noda |
| 2009/0190236 | A1* | 7/2009 | Do ............................... 359/716 |

* cited by examiner

*Primary Examiner* — Alicia M Harrington
(74) *Attorney, Agent, or Firm* — Morris Manning & Martin LLP; Tim Tingkang Xia, Esq.

(57) ABSTRACT

This invention provides an imaging lens assembly including: in order from an object side toward an image side: a first lens with positive refractive power having a convex object-side surface and a convex image-side surface, a second lens with negative refractive power having at least one of its object-side surface and image-side surface being aspheric, a third lens with negative refractive power having a concave image-side surface, and both of its object-side surface and image-side surface being aspheric. An aperture stop is positioned between the first lens element and second lens element. The imaging lens assembly further comprises an electronic sensor on which an object is imaged, and there are three lens elements with refractive power.

23 Claims, 25 Drawing Sheets

| TABLE 1 | | | | | | |
|---|---|---|---|---|---|---|
| (Embodiment 1) | | | | | | |
| f (= 2.94 mm, Fno = 2.85, HFOV = 30.9 deg. | | | | | | |
| Surface # | | Curvature Radius | Thickness | Material | Index | Abbe # | Focal length |
| 0 | Object | Plano | Infinity | | | | |
| 1 | Lens 1 | 1.19531 (ASP) | 0.529 | Plastic | 1.544 | 55.9 | 2.17 |
| 2 | | -100.00000 (ASP) | 0.011 | | | | |
| 3 | Ape. Stop | Plano | 0.455 | | | | |
| 4 | Lens 2 | -0.81723 (ASP) | 0.452 | Plastic | 1.632 | 23.4 | -7.81 |
| 5 | | -1.18917 (ASP) | 0.357 | | | | |
| 6 | Lens 3 | 1.56295 (ASP) | 0.512 | Plastic | 1.544 | 55.9 | -41.54 |
| 7 | | 1.29311 (ASP) | 0.300 | | | | |
| 8 | IR-filter | Plano | 0.300 | Glass | 1.517 | 64.2 | - |
| 9 | | Plano | 0.100 | | | | |
| 10 | Cover-glass | Plano | 0.400 | Glass | 1.517 | 64.2 | - |
| 11 | | Plano | 0.207 | | | | |
| 12 | Image | Plano | - | | | | |

Fig.13

| TABLE 2 | | | |
|---|---|---|---|
| Aspheric Coefficients | | | |
| Surface # | 1 | 2 | 4 |
| k = | -1.70385E+00 | -1.00000E+00 | -1.31512E+00 |
| A4 = | 7.67879E-02 | -1.56097E-01 | -2.35158E-01 |
| A6 = | -4.58698E-02 | -4.79651E-01 | -6.29168E-01 |
| A8 = | -3.26052E-01 | 1.67180E+00 | 8.87475E+00 |
| A10= | 1.36337E-01 | -1.02020E+01 | -2.83446E+01 |
| A12= | -1.02715E+00 | 2.04499E+01 | 2.70740E+01 |
| Surface # | 5 | 6 | 7 |
| k = | -6.46829E-01 | -9.35664E+00 | -5.30143E+00 |
| A4 = | -6.31957E-02 | -2.86962E-01 | -2.50554E-01 |
| A6 = | 2.34261E-01 | 2.29278E-01 | 1.61519E-01 |
| A8 = | 1.46455E+00 | -8.68173E-02 | -9.28945E-02 |
| A10= | -1.95730E+00 | 9.14338E-03 | 3.09188E-02 |
| A12= | 7.10910E-01 | 1.27783E-03 | -4.87656E-03 |

Fig.14

| TABLE 3 | | | | | | |
|---|---|---|---|---|---|---|
| (Embodiment 2) | | | | | | |
| f= 2.90 mm, Fno = 2.80, HFOV = 31.3 deg. | | | | | | |
| Surface # | | Curvature Radius | Thickness | Material | Index | Abbe # | Focal length |
| 0 | Object | Plano | Infinity | | | | |
| 1 | Lens 1 | 1.16024 (ASP) | 0.482 | Plastic | 1.544 | 55.9 | 2.05 |
| 2 | | -24.09640 (ASP) | -0.002 | | | | |
| 3 | Ape. Stop | Plano | 0.470 | | | | |
| 4 | Lens 2 | -0.85943 (ASP) | 0.396 | Plastic | 1.650 | 21.4 | -5.54 |
| 5 | | -1.33383 (ASP) | 0.343 | | | | |
| 6 | Lens 3 | 1.61082 (ASP) | 0.594 | Plastic | 1.544 | 55.9 | -22.00 |
| 7 | | 1.23528 (ASP) | 0.300 | | | | |
| 8 | IR-filter | Plano | 0.300 | Glass | 1.517 | 64.2 | - |
| 9 | | Plano | 0.100 | | | | |
| 10 | Cover-glass | Plano | 0.400 | Glass | 1.517 | 64.2 | - |
| 11 | | Plano | 0.079 | | | | |
| 12 | Image | Plano | - | | | | |

Fig.15

| TABLE 4 | | | |
|---|---|---|---|
| Aspheric Coefficients | | | |
| Surface # | 1 | 2 | 4 |
| k   = | -1.82230E+00 | -1.00000E+00 | -9.24303E-01 |
| A4 = | 8.24636E-02 | -2.08669E-01 | -3.77124E-01 |
| A6 = | -3.33345E-01 | -7.22338E-01 | -5.85506E-02 |
| A8 = | 7.61277E-01 | 3.06729E+00 | 8.84259E+00 |
| A10= | -3.18768E+00 | -1.57747E+01 | -2.75629E+01 |
| A12= | 1.19634E+00 | 2.82957E+01 | 2.70742E+01 |
| Surface # | 5 | 6 | 7 |
| k   = | 3.62696E-01 | -1.07163E+01 | -3.87518E+00 |
| A4 = | -2.92794E-01 | -5.50362E-01 | -3.99178E-01 |
| A6 = | 8.02370E-01 | 3.95333E-01 | 2.95925E-01 |
| A8 = | 1.26480E+00 | -8.63931E-02 | -1.94962E-01 |
| A10= | -1.26581E+00 | -5.01681E-02 | 7.18386E-02 |
| A12= | 3.79314E-03 | 2.86434E-02 | -1.19830E-02 |

Fig.16

| TABLE 5 | | | | | | | |
|---|---|---|---|---|---|---|---|
| (Embodiment 3) | | | | | | | |
| f = 2.70 mm, Fno = 2.80, HFOV = 32.9 deg. | | | | | | | |
| Surface # | | Curvature Radius | Thickness | Material | Index | Abbe # | Focal length |
| 0 | Object | Plano | Infinity | | | | |
| 1 | Lens 1 | 1.22108 (ASP) | 0.421 | Plastic | 1.544 | 55.9 | 2.02 |
| 2 | | -9.61540 (ASP) | -0.011 | | | | |
| 3 | Ape. Stop | Plano | 0.469 | | | | |
| 4 | Lens 2 | -0.68820 (ASP) | 0.300 | Plastic | 1.650 | 21.4 | -10.29 |
| 5 | | -0.89889 (ASP) | 0.428 | | | | |
| 6 | Lens 3 | 1.49331 (ASP) | 0.453 | Plastic | 1.544 | 55.9 | -10.41 |
| 7 | | 1.05540 (ASP) | 0.300 | | | | |
| 8 | IR-filter | Plano | 0.300 | Glass | 1.517 | 64.2 | - |
| 9 | | Plano | 0.460 | | | | |
| 10 | Image | Plano | - | | | | |

Fig.17

| TABLE 6 | | | |
|---|---|---|---|
| Aspheric Coefficients | | | |
| Surface # | 1 | 2 | 4 |
| k = | -1.55354E+00 | -1.00000E+00 | -1.07366E+00 |
| A4 = | -2.61427E-02 | -2.98262E-01 | -2.74432E-01 |
| A6 = | -3.51695E-01 | -9.75913E-01 | 1.09542E+00 |
| A8 = | 9.69524E-02 | 5.91419E+00 | 1.09115E+01 |
| A10= | -2.93566E+00 | -3.10835E+01 | -3.48916E+01 |
| A12= | 3.77332E-01 | 5.75157E+01 | 2.50644E+01 |
| Surface # | 5 | 6 | 7 |
| k = | -4.16225E-01 | -2.02425E+01 | -9.43324E+00 |
| A4 = | -4.50876E-02 | -3.59068E-01 | -2.55453E-01 |
| A6 = | 1.19299E+00 | 2.72356E-01 | 1.54439E-01 |
| A8 = | 2.47266E+00 | -1.37467E-01 | -1.21620E-01 |
| A10= | -1.87761E+00 | 4.36485E-02 | 5.32979E-02 |
| A12= | -3.12762E+00 | -5.10554E-03 | -1.08582E-02 |

Fig.18

| TABLE 7 | | | | | | | |
|---|---|---|---|---|---|---|---|
| (Embodiment 4) | | | | | | | |
| f = 2.90 mm, Fno = 2.07, HFOV = 31.0 deg. | | | | | | | |
| Surface # | | Curvature Radius | Thickness | Material | Index | Abbe # | Focal length |
| 0 | Object | Plano | Infinity | | | | |
| 1 | Lens 1 | 1.26964 (ASP) | 0.570 | Plastic | 1.544 | 55.9 | 2.20 |
| 2 | | -17.34780 (ASP) | -0.048 | | | | |
| 3 | Ape. Stop | Plano | 0.472 | | | | |
| 4 | Lens 2 | -0.79818 (ASP) | 0.280 | Plastic | 1.650 | 21.4 | -8.13 |
| 5 | | -1.07014 (ASP) | 0.415 | | | | |
| 6 | Lens 3 | 2.86715 (ASP) | 0.721 | Plastic | 1.583 | 30.2 | -26.15 |
| 7 | | 2.18994 (ASP) | 0.300 | | | | |
| 8 | IR-filter | Plano | 0.300 | Glass | 1.517 | 64.2 | - |
| 9 | | Plano | 0.459 | | | | |
| 10 | Image | Plano | - | | | | |

Fig.19

| TABLE 8 | | | |
|---|---|---|---|
| Aspheric Coefficients | | | |
| Surface # | 1 | 2 | 4 |
| k    = | -1.16842E+00 | -1.00000E+00 | -1.69534E+00 |
| A4 = | -4.03131E-03 | -1.19925E-01 | -5.64684E-02 |
| A6 = | 5.67592E-02 | -6.75961E-01 | -4.24684E-01 |
| A8 = | -5.91917E-01 | 2.09275E+00 | 7.26110E+00 |
| A10= | 9.81080E-01 | -4.31688E+00 | -1.67779E+01 |
| A12= | -1.35566E+00 | 3.34786E+00 | 1.28466E+01 |
| Surface # | 5 | 6 | 7 |
| k    = | -3.94558E-01 | -1.31590E+01 | -4.32583E+00 |
| A4 = | 1.75108E-01 | -2.84023E-01 | -2.36637E-01 |
| A6 = | 1.28869E-01 | 2.10326E-01 | 1.37301E-01 |
| A8 = | 2.77062E+00 | -1.03798E-01 | -7.73514E-02 |
| A10= | -4.55501E+00 | -5.04669E-02 | 2.05177E-02 |
| A12= | 2.76573E+00 | 4.72278E-02 | -2.42919E-03 |

Fig.20

| TABLE 9 | | | | | | |
|---|---|---|---|---|---|---|
| (Embodiment 5) | | | | | | |
| f = 2.74 mm, Fno = 2.60, HFOV = 32.5 deg. | | | | | | |
| Surface # | | Curvature Radius | Thickness | Material | Index | Abbe # | Focal length |
| 0 | Object | Plano | Infinity | | | | |
| 1 | Lens 1 | 0.96621 (ASP) | 0.468 | Plastic | 1.544 | 55.9 | 2.17 |
| 2 | | 4.39540 (ASP) | 0.039 | | | | |
| 3 | Ape. Stop | Plano | 0.401 | | | | |
| 4 | Lens 2 | -0.82940 (ASP) | 0.342 | Plastic | 1.650 | 21.4 | -7.81 |
| 5 | | -1.15244 (ASP) | 0.413 | | | | |
| 6 | Lens 3 | 1.38056 (ASP) | 0.497 | Plastic | 1.544 | 55.9 | -54.10 |
| 7 | | 1.15142 (ASP) | 0.300 | | | | |
| 8 | IR-filter | Plano | 0.300 | Glass | 1.517 | 64.2 | - |
| 9 | | Plano | 0.408 | | | | |
| 10 | Image | Plano | - | | | | |

Fig.21

| TABLE 10A | | | |
|---|---|---|---|
| Aspheric Coefficients | | | |
| Surface # | 1 | 2 | 4 |
| k = | -1.03156E+00 | -1.00000E+00 | -6.64627E-01 |
| A4 = | 1.26020E-01 | -9.66277E-02 | -4.25715E-01 |
| A6 = | 1.54625E-01 | -3.46009E-01 | -2.01217E+00 |
| A8 = | -9.26220E-01 | 6.58579E-01 | 1.83754E+01 |
| A10= | 2.74480E+00 | -1.19598E+01 | -4.79194E+01 |
| A12= | -5.45161E+00 | 2.65932E+01 | 2.70734E+01 |
| Surface # | 5 | 7 | |
| k = | 2.96009E-02 | -4.84866E+00 | |
| A4 = | -3.18753E-01 | -3.65189E-01 | |
| A6 = | 5.53197E-01 | 2.53612E-01 | |
| A8 = | 1.47736E+00 | -1.67439E-01 | |
| A10= | 1.69599E-01 | 6.40158E-02 | |
| A12= | -1.65534E+00 | -1.09042E-02 | |

Fig.22A

| TABLE 10B | |
|---|---|
| Aspheric Coefficients | |
| Surface # | 6 |
| k = | -7.69584E+00 |
| A1 = | |
| A2 = | |
| A3 = | |
| A4 = | -5.00815E-01 |
| A5 = | |
| A6 = | 3.53114E-01 |
| A7 = | |
| A8 = | -9.10381E-02 |
| A9 = | |
| A10= | -9.08558E-03 |
| A11= | |
| A12= | 6.72374E-03 |

Fig.22B

| TABLE 11 | | | | | | |
|---|---|---|---|---|---|---|
| (Embodiment 6) | | | | | | |
| f = 1.90 mm, Fno = 2.40, HFOV= 32.5 deg. | | | | | | |
| Surface # | | Curvature Radius | Thickness | Material | Index | Abbe # | Focal length |
| 0 | Object | Plano | Infinity | | | | |
| 1 | Lens 1 | 0.77505 (ASP) | 0.430 | Plastic | 1.544 | 55.9 | 1.46 |
| 2 | | 24.20920 (ASP) | 0.017 | | | | |
| 3 | Ape. Stop | Plano | 0.243 | | | | |
| 4 | Lens 2 | -0.53744 (ASP) | 0.300 | Plastic | 1.632 | 23.4 | -6.75 |
| 5 | | -0.74777 (ASP) | 0.167 | | | | |
| 6 | Lens 3 | 1.52476 (ASP) | 0.429 | Plastic | 1.544 | 55.9 | -37.65 |
| 7 | | 1.27843 (ASP) | 0.100 | | | | |
| 8 | IR-filter | Plano | 0.200 | Glass | 1.517 | 64.2 | - |
| 9 | | Plano | 0.462 | | | | |
| 10 | Image | Plano | - | | | | |

Fig.23

| TABLE 12 | | | |
|---|---|---|---|
| Aspheric Coefficients | | | |
| Surface # | 1 | 2 | 4 |
| k = | -1.49484E+00 | -5.02658E-12 | -2.51268E+00 |
| A4 = | 3.58977E-01 | -2.48147E-01 | -1.24045E+00 |
| A6 = | -5.47228E-01 | -8.06477E+00 | -1.26679E+01 |
| A8 = | 1.99813E+00 | 9.75334E+01 | 2.83081E+02 |
| A10= | -9.40792E+00 | -8.19428E+02 | -1.86890E+03 |
| A12= | -3.98155E+01 | 2.51387E+03 | 3.74071E+03 |
| Surface # | 5 | 6 | 7 |
| k = | -5.56597E-01 | -3.12489E+01 | -6.66761E+00 |
| A4 = | -1.89391E-01 | -9.36577E-01 | -9.68992E-01 |
| A6 = | 2.55436E+00 | 2.24350E+00 | 1.60223E+00 |
| A8 = | 2.29356E+01 | -2.48674E+00 | -2.28681E+00 |
| A10= | -5.58642E+01 | 6.11388E-01 | 1.86216E+00 |
| A12= | 1.52531E+00 | 4.30908E-01 | -7.24430E-01 |

Fig.24

| TABLE 13 | | | | | | |
|---|---|---|---|---|---|---|
| | Embodiment 1 | Embodiment 2 | Embodiment 3 | Embodiment 4 | Embodimant 5 | Embodimant 6 |
| f | 2.94 | 2.90 | 2.70 | 2.90 | 2.74 | 1.90 |
| Fno | 2.85 | 2.80 | 2.80 | 2.07 | 2.60 | 2.40 |
| HFOV | 30.9 | 31.3 | 32.9 | 31.0 | 32.5 | 32.5 |
| V1-V2 | 32.5 | 34.5 | 34.5 | 34.5 | 34.5 | 32.5 |
| R1/R2 | -0.01 | -0.05 | -0.13 | -0.07 | 0.22 | 0.03 |
| R5/R6 | 1.21 | 1.30 | 1.41 | 1.31 | 1.20 | 1.19 |
| R1/f | 0.41 | 0.40 | 0.45 | 0.44 | 0.35 | 0.41 |
| R3/f | -0.28 | -0.30 | -0.25 | -0.28 | -0.30 | -0.28 |
| f/f1 | 1.35 | 1.41 | 1.34 | 1.32 | 1.26 | 1.30 |
| f/f2 | -0.38 | -0.52 | -0.26 | -0.36 | -0.35 | -0.28 |
| f2/f3 | 0.19 | 0.25 | 0.99 | 0.31 | 0.14 | 0.18 |
| (T12/f)*10 | 1.59 | 1.61 | 1.70 | 1.46 | 1.61 | 1.37 |
| SL/TTL | 0.84 | 0.85 | 0.86 | 0.85 | 0.83 | 0.80 |
| TTL/ImgH | 1.94 | 1.84 | 1.73 | 1.92 | 1.75 | 1.90 |

Fig.25

IMAGING LENS ASSEMBLY

BACKGROUND OF THE INVENTION

1. Field of the Invention

The present invention relates to an imaging lens assembly, and more particularly, to a compact imaging lens assembly used in portable electronic devices.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional compact imaging lens assembly, utilizing two-piece lens structure for lower production costs, such as the one disclosed in U.S. Pat. No. 7,525,741, generally comprises two lens elements in the imaging lens assembly. Due to its limited ability to correct aberrations of the two-piece lens structure, it cannot satisfy the needs of higher level camera modules. On the other hand, it cannot stay compact when the total track length increases from allocating more lens elements for better image quality.

In order to obtain better image quality while being compact, an imaging lens assembly with three lens element structure becomes a favorable solution. U.S. Pat. No. 7,436,603 provides an imaging lens assembly with three lens element structure comprising, in order from the object-side to the image side, a first lens element with positive refractive power, a second lens element with negative refractive power, and a third lens element with positive refractive power, which comprises the lens arrangement of a triplet. Although such an arrangement can correct most of the aberrations, it requires a longer total optical track length, resulting the lengthening of the lens structure corresponding to the total optical track length, and is unable to satisfy the need for a lighter and compact camera lens assembly.

Therefore, a need exists in the art for an imaging lens assembly that features better image quality, maintains a moderate total track length and is applicable to compact portable electronic products.

SUMMARY OF THE INVENTION

The present invention provides an imaging lens assembly comprising: in order from an object side to an image side: a first lens element with positive refractive power having a convex object-side surface and a convex image-side surface; a second lens element with negative refractive power, at least one of the object-side and image-side surfaces thereof being aspheric; and a third lens element with negative refractive power having a concave image-side surface, both of the object-side and image-side surfaces thereof being aspheric; wherein the imaging lens assembly further comprises an aperture stop and an electronic sensor for image formation, wherein the aperture stop is disposed between the first lens element and the second lens element; wherein there are three lens elements with refractive power; and wherein the focal length of the imaging lens assembly is f, the focal length of the second lens element is f2, the radius of curvature of the object-side surface of the first lens element is R1, the radius of curvature of the image-side surface of the first lens element is R2, the radius of curvature of the object-side surface of the second lens element is R3, the distance on the optical axis between the aperture stop and the electronic sensor is SL, the distance on the optical axis between the object-side surface of the first lens element and the electronic sensor is TTL, and they satisfy the relation: $-0.70 < f/f2 < -0.24$; $-0.30 < R1/R2 < 0.00$; $-0.40 < R3/f < -0.24$; $0.75 < SL/TTL < 0.90$.

According to another aspect of the present invention, an imaging lens assembly comprises, in order from an object side to an image side: a first lens element with positive refractive power having a convex object-side surface and a convex image-side surface; a second lens element with negative refractive power having a concave object-side surface and a convex image-side surface, at least one of the object-side and image-side surfaces thereof being aspheric; a third lens element with negative refractive power having a concave image-side surface, both of the object-side and image-side surfaces thereof being aspheric, at least one inflection point is formed on one of the both surfaces; wherein the imaging lens assembly further comprises an aperture stop and an electronic sensor for image formation, wherein the aperture stop is disposed between the first lens element and the second lens element; wherein there are three lens elements with refractive power; and wherein the focal length of the imaging lens assembly is f, the focal length of the second lens element is f2, the radius of curvature of the object-side surface of the first lens element is R1, the radius of curvature of the image-side surface of the first lens element is R2, the Abbe number of the first lens element is V1, the Abbe number of the second lens element is V2, the distance on the optical axis between the aperture stop and the electronic sensor is SL, the distance on the optical axis between the object-side surface of the first lens element and the electronic sensor is TTL, and they satisfy the relation: $-0.70 < f/f2 < -0.24$; $-0.30 < R1/R2 < 0.00$; $31.0 < V1-V2 < 45.0$; $0.75 < SL/TTL < 0.90$.

Such an arrangement of optical elements can effectively correct the aberrations as well as reduce the sensitivity of the imaging lens assembly and the total track length of the imaging lens assembly in order to maintain a compact size.

In the present imaging lens assembly, the first lens element has positive refractive power, which provides the main source of refractive power, so that the total track length of the imaging lens assembly can be effectively reduced; the second lens element has negative refractive power so that the aberration generated from the positive refractive power of the first lens element and the chromatic aberration of the system can be favorably corrected; the third lens element with negative refractive power can place the principal point of the optical system away from the image plane, reducing the total track length in order to maintain a compact imaging lens system.

In the present imaging lens assembly, the first lens element may be a bi-convex lens element having a convex object-side surface and a convex image-side surface. When the first lens element is a bi-convex lens element, the refractive power thereof can be effectively enhanced, thus allowing a shortening of the total track length of the imaging lens assembly. The second lens element can be a meniscus lens element having a concave object-side surface and a convex image-side surface so as to correct the astigmatism of the system. The third lens element has a concave image-side surface so that the principal point of the system can be away from the image plane, and the total track length of the system can be reduced, in order to maintain the compact size of the lens assembly.

In the aforementioned imaging lens assembly, the aperture stop is disposed between the first lens element and the second lens element. The first lens element provides positive refractive power, and the aperture stop is disposed near the object side of the imaging lens assembly, thereby the total track length of the imaging lens assembly can be reduced effectively. The aforementioned arrangement also enables the exit pupil of the imaging lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the third lens element is provided with at least one inflection point, thereby the angle at which the light is projected onto the sensor from the off-axis field can be effectively reduced to further correct the off-axis aberrations. In addition, when the aperture stop is disposed closer to the second lens elements, a wide field of view can be favorably achieved. Such stop placement facilitates the correction of the distortion and chromatic aberration of magnification, and the mitigation of the system's sensitivity. Therefore, in the present imaging lens assembly, the aperture stop is placed between the first lens element and the second lens element for achieving a balance between reducing the size of the imaging lens assembly and lowering the sensitivity of the imaging lens assembly.

BRIEF DESCRIPTION OF THE DRAWINGS

FIG. 13 is TABLE 1 which lists the optical data of the first embodiment.

FIG. 14 is TABLE 2 which lists the aspheric surface data of the first embodiment.

FIG. 15 is TABLE 3 which lists the optical data of the second embodiment.

FIG. 16 is TABLE 4 which lists the aspheric surface data of the second embodiment.

FIG. 17 is TABLE 5 which lists the optical data of the third embodiment.

FIG. 18 is TABLE 6 which lists the aspheric surface data of the third embodiment.

FIG. 19 is TABLE 7 which lists the optical data of the fourth embodiment.

FIG. 20 is TABLE 8 which lists the aspheric surface data of the fourth embodiment.

FIG. 21 is TABLE 9 which lists the optical data of the fifth embodiment.

FIGS. 22A and 22B are TABLES 10A and 10B which list the aspheric surface data of the fifth embodiment.

FIG. 23 is TABLE 11 which lists the optical data of the sixth embodiment.

FIG. 24 is TABLE 12 which lists the aspheric surface data of the sixth embodiment.

FIG. 25 is TABLE 13 which lists the data of the respective embodiments resulting from the equations.

DETAILED DESCRIPTION OF THE PREFERRED EMBODIMENTS

Figure 1:
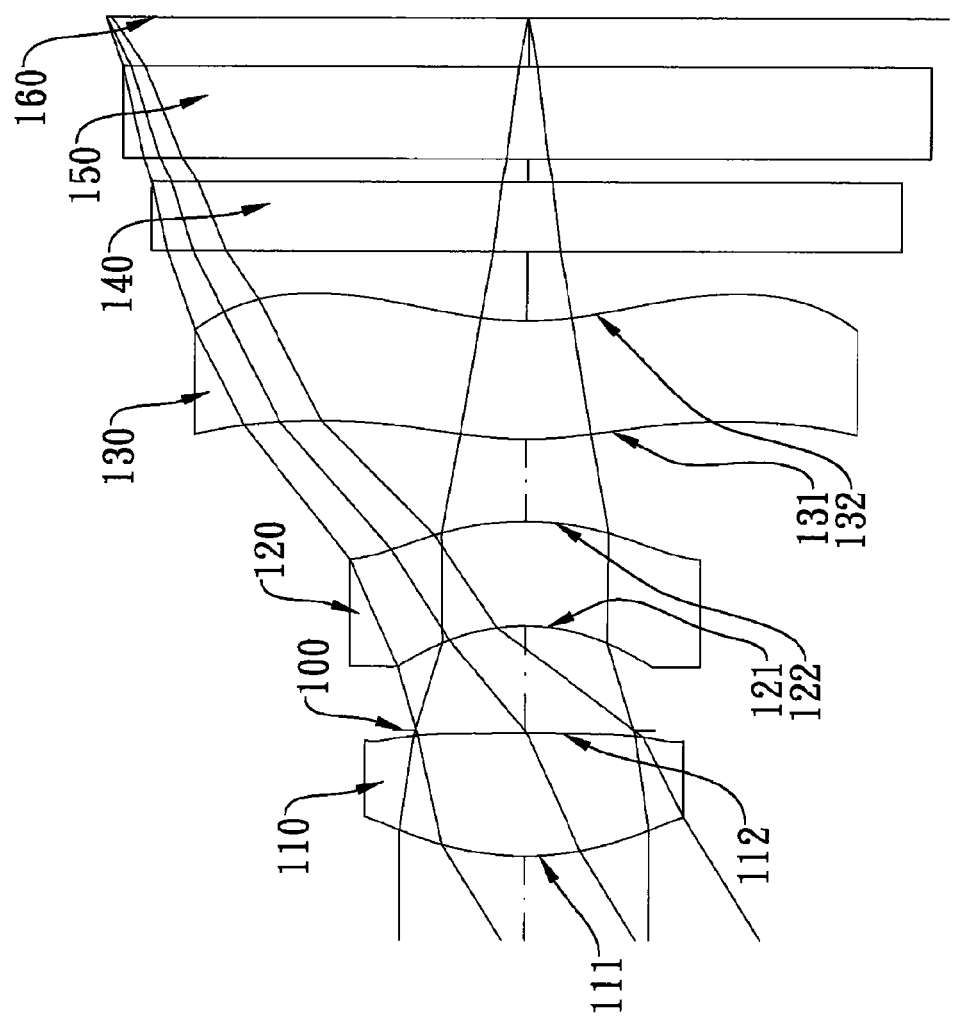
FIG. 1 shows an imaging lens assembly in accordance with a first embodiment of the present invention.

The present invention provides an imaging lens assembly comprising, in order from the object side to the image side: a first lens element with positive refractive power having a convex object-side surface and a convex image-side surface; a second lens element with negative refractive power, at least one of the object-side and image-side surfaces thereof being aspheric; and a third lens element with negative refractive power having a concave image-side surface, both of the object-side and image-side surfaces thereof being aspheric; wherein the imaging lens assembly further comprises an aperture stop and an electronic sensor for image formation; wherein the aperture stop is disposed between the first lens element and the second lens element, and there are three lens elements with refractive power; and wherein the focal length of the imaging lens assembly is f, the focal length of the second lens element is f2, the radius of curvature of the object-side surface of the first lens element is R1, the radius of curvature of the image-side surface of the first lens element is R2, the radius of curvature of the object-side surface of the second lens element is R3, the distance on the optical axis between the aperture stop and the electronic sensor is SL, the distance on the optical axis between the object-side surface of the first lens element and the electronic sensor is TTL, and they satisfy the relation: $-0.70<f/f2<-0.24$; $-0.30<R1/R2<0.00$; $-0.40<R3/f<-0.24$; $0.75<SL/TTL<0.90$.

When the aforementioned imaging lens assembly satisfies the above relation: $-0.70<f/f2<-0.24$, the imaging lens assembly can effectively correct the aberrations generated by the first lens element with positive refractive power, prevent the refractive power of the second lens from becoming too large as well as too much high order aberration; preferably, the imaging lens assembly satisfy the relation: $-0.45<f/f2<-0.29$. When the aforementioned imaging lens assembly satisfies the relation: $-0.30<R1/R2<0.00$, it can correct the spherical aberration of the system effectively; preferably, it satisfies the relation: $-0.15<R1/R2<0.00$. When the aforementioned imaging lens assembly satisfies the relation: $-0.40<R3/f<-0.24$, the back focal length of the system can be effectively increased, to leave enough space for insertion of other components in the imaging lens assembly. When the aforementioned imaging lens assembly satisfies the relation: $0.75<SL/TTL<0.90$, the imaging lens assembly can obtain a good balance between reducing the total track length and lowering the sensitivity of the system.

In the aforementioned imaging lens assembly, it is preferable that the second lens element has a concave object-side surface and a convex image-side surface so as to effectively correct the aberration of the system; preferably, the third lens element is provided with at least one inflection point, thereby the angle at which the light is projected onto the sensor from the off-axis field can be effectively reduced to further correct the off-axis aberrations; preferably, the third lens element is made of plastic material. Plastic material is favorable for aspheric lens production and also reducing the production cost.

In the aforementioned imaging lens assembly, the focal length of the imaging lens assembly is f, the focal length of the first lens element is f1, and they preferably satisfy the relation: 1.10<f/f1<1.48. When the above relation is satisfied, the refractive power of the first lens element is more balanced so that the total track length of the system can be effectively controlled to keep the imaging lens assembly compact. The above relation also prevents the high order spherical aberration from becoming too large, so that the image quality can be improved.

In the aforementioned imaging lens assembly, the Abbe number of the first lens element is V1, the Abbe number of the second lens element is V2, and they preferably satisfy the relation: 31.0<V1−V2<45.0. The above relation facilitates the correction of the chromatic aberration of the imaging lens assembly.

In the aforementioned imaging lens assembly, the radius of curvature of the object-side surface of the first lens element is R1, the focal length of the imaging lens assembly is f, and they preferably satisfy the relation: 0.30<R1/f<0.50. When the above relation is satisfied, the first lens element is provided with sufficient positive refractive power while preventing high order aberration from becoming too large.

In the aforementioned imaging lens assembly, the focal length of the second lens element is f2, the focal length of the third lens element is f3, and they preferably satisfy the relation: 0.08<f2/f3<0.40. When the above relation is satisfied, the distribution of refractive power from the second lens element and the third lens element is more balanced, which reduces aberrations and the sensitivity of the system.

In the aforementioned imaging lens assembly, the radius of curvature of the object-side surface of the third lens element is R5, the radius of curvature of the image-side surface of the third lens element is R6, and they preferably satisfy the relation: 1.10<R5/R6<1.60. When the above relation is satisfied, the third lens element acts as a correction lens element for aberration correction of the system in order to improve image quality.

In the aforementioned imaging lens assembly, the distance on the optical axis between the first and second lens elements is T12, the focal length of the imaging lens assembly is f, and they preferably satisfy the relation: 1.35<(T12/f)*10<1.85. When the above relation is satisfied, the distance on the optical axis between the first lens element and the second lens element is sufficient for the aperture placement and avoids overly large spacing in order to maintain the compact size of the system.

In the aforementioned imaging lens assembly, the distance on the optical axis between the object-side surface of the first lens element and the electronic sensor is TTL, half of the diagonal length of the effective pixel area of the electronic sensor is ImgH, and they preferably satisfy the relation: TTL/ImgH<2.0. The above relation enables the imaging lens assembly to maintain a compact form so that it can be installed in compact portable electronic products.

According to another aspect of the present invention, an imaging lens assembly comprises, in order from the object side to the image side: a first lens element with positive refractive power having a convex object-side surface and a convex image-side surface; a second lens element with negative refractive power having a concave object-side surface and a convex image-side surface, at least one of the object-side and image-side surfaces thereof being aspheric; and a third lens element with negative refractive power having a concave image-side surface, both of the object-side and image-side surfaces thereof being aspheric, at least one inflection point is formed on one of the both surfaces; wherein the aperture stop is disposed between the first lens element and the second lens element, and there are three lens elements with refractive power; and wherein the focal length of the imaging lens assembly is f, the focal length of the second lens element is f2, the focal length of the first lens element is f1, the distance on the optical axis between the aperture stop and the electronic sensor is SL, the distance on the optical axis between the object-side surface of the first lens element and the electronic sensor is TTL, and they satisfy the relation: −0.45<f/f2<−0.29; 1.10<f/f1<1.48; 0.75<SL/TTL<0.90.

When the aforementioned imaging lens assembly satisfies the above relation: −0.45<f/f2<−0.29, the imaging lens assembly can effectively correct the aberrations generated by the first lens element with positive refractive power, prevent the refractive power of the second lens from becoming too large as well as too much high order aberration. When the aforementioned imaging lens assembly satisfies the relation: 1.10<f/f1<1.48, the refractive power of the first lens element is more balanced so that the total track length of the system can be effectively controlled to keep the imaging lens assembly compact. The above relation also prevents the high order spherical aberration from becoming too large, so that the image quality can be improved. When the aforementioned imaging lens assembly satisfies the relation: 0.75<SL/TTL<0.90, the imaging lens assembly can obtain a good balance between reducing the total track length and lowering the sensitivity of the system.

In the aforementioned imaging lens assembly, the radius of curvature of the object-side surface of the first lens element is R1, the radius of curvature of the image-side surface of the first lens element is R2, and they preferably satisfy the relation: −0.30<R1/R2<0.00. When the above relation is satisfied, it can correct the spherical aberration of the system effectively; preferably, it satisfies the relation: −0.15<R1/R2<0.00.

In the aforementioned imaging lens assembly, the Abbe number of the first lens element is V1, the Abbe number of the second lens element is V2, and they preferably satisfy the relation: 31.0<V1−V2<45.0. When the above relation is satisfied, the chromatic aberration of the imaging lens assembly can be favorably corrected; preferably, they satisfy the relation: 33.5<V1−V2<45.0.

In the aforementioned imaging lens assembly, the distance on the optical axis between the first lens element and the second lens element is T12, the focal length of the imaging lens assembly is f, and they satisfy the relation: 1.35<(T12/f)*10<1.85, When the above relation is satisfied, the distance on the optical axis between the first lens element and the second lens element is sufficient for the aperture placement and avoids overly large spacing in order to maintain the compact size of the system.

In the aforementioned imaging lens assembly, the radius of curvature of the object-side surface of the first lens element is R1, the focal length of the imaging lens assembly is f, and they preferably satisfy the relation: 0.30<R1/f<0.50. When the above relation is satisfied, the first lens element is provided with sufficient positive refractive power while preventing high order aberration from becoming too large.

In the aforementioned imaging lens assembly, the focal length of the second lens element is f2, the focal length of the third lens element is f3, and they preferably satisfy the relation: 0.08<f2/f3<0.40. When the above relation is satisfied, the distribution of refractive power from the second lens element and the third lens element is more balanced, which reduces aberrations and the sensitivity of the system.

According to another aspect of the present invention, an imaging lens assembly comprises, in order from the object side to the image side: a first lens element with positive refractive power having a convex object-side surface and a convex image-side surface; a second lens element with negative refractive power having a concave object-side surface and a convex image-side surface, at least one of the object-side and image-side surfaces thereof being aspheric; and a third lens element with negative refractive power having a concave image-side surface, both of the object-side and image-side surfaces thereof being aspheric, at least one inflection point is formed on one of the both surfaces; wherein the aperture stop is disposed between the first lens element and the second lens element, and there are three lens elements with refractive power; and wherein the focal length of the imaging lens assembly is f, the focal length of the second lens element is f2, the radius of curvature of the object-side surface of the first lens element is R1, the radius of curvature of the image-side surface of the first lens element is R2, the Abbe number of the first lens element is V1, the Abbe number of the second lens element is V2, the distance on the optical axis between the aperture stop and the electronic sensor is SL, the distance on the optical axis between the object-side surface of the first lens element and the electronic sensor is TTL, and they satisfy the relation: $-0.70<f/f2<-0.24$; $-0.30<R1/R2<0.00$; $31.0<V1-V2<45.0$; $0.75<SL/TTL<0.90$.

When the aforementioned imaging lens assembly satisfies the relation: $-0.70<f/f2<-0.24$, the imaging lens assembly can effectively correct the aberrations generated by the first lens element with positive refractive power, prevent the refractive power of the second lens from becoming too large as well as too much high order aberration; preferably, they satisfy the relation: $-0.45<f/f2<-0.29$. When the aforementioned imaging lens assembly satisfies the relation: $-0.30<R1/R2<0.00$, it can correct the spherical aberration of the system effectively. When the aforementioned imaging lens assembly satisfies the relation: $31.0<V1-V2<45.0$, the chromatic aberration of the imaging lens assembly can be favorably corrected; preferably, they satisfy the relation: $33.5<V1-V2<45.0$. When the aforementioned imaging lens assembly satisfies the relation: $0.75<SL/TTL<0.90$, the imaging lens assembly can obtain a good balance between reducing the total track length and lowering the sensitivity of the system.

In the aforementioned imaging lens assembly, the first, the second, and the third lens elements are made of plastic material. Plastic material is favorable for the aspheric lens production and also reducing production costs.

In the aforementioned imaging lens assembly, the distance on the optical axis between the first lens element and the second lens element is T12, the focal length of the imaging lens assembly is f, and they satisfy the relation: $1.35<(T12/f)*10<1.85$, When the above relation is satisfied, the distance on the optical axis between the first lens element and the second lens element is sufficient for the aperture placement and avoids overly large spacing in order to maintain the compact size of the system.

In the present imaging lens assembly, the lens elements can be made of glass or plastic material. If the lens elements are made of glass, there is more freedom in distributing the refractive power of the system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens assembly can be effectively reduced and the image quality can be improved as well.

In the present imaging lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 2:
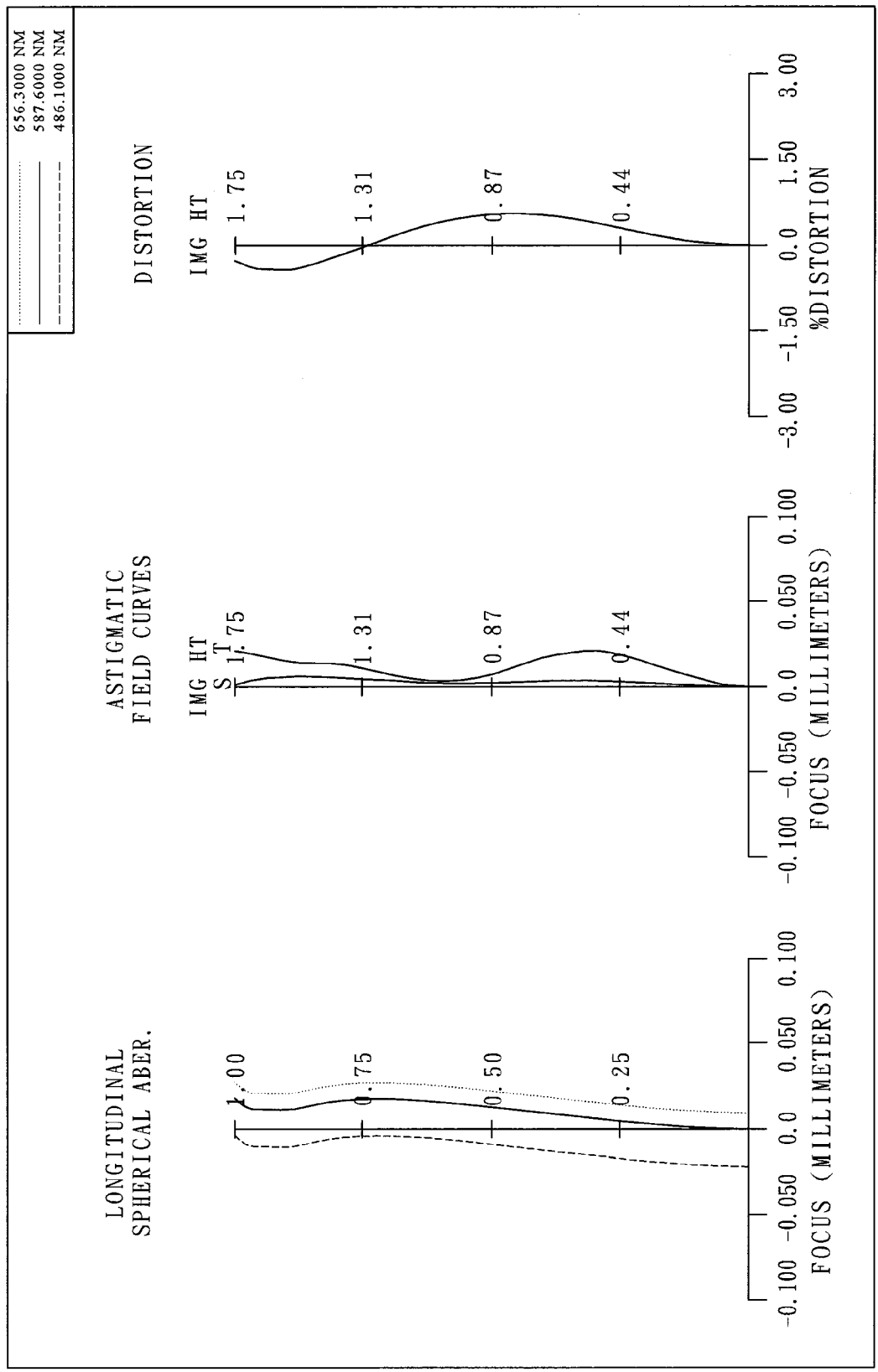
FIG. 2 shows the aberration curves of the first embodiment of the present invention.

FIG. 1 shows an imaging lens assembly in accordance with a first embodiment of the present invention, and FIG. 2 shows the aberration curves of the first embodiment of the present invention. The imaging lens assembly of the first embodiment of the present invention mainly comprises three lens elements, in order from the object side to the image side: a plastic first lens element 110 with positive refractive power having a convex object-side surface 111 and a convex image-side surface 112, the object-side and image-side surfaces 111 and 112 thereof being aspheric; a plastic second lens element 120 with negative refractive power having a concave object-side surface 121 and a convex image-side surface 122, the object-side and image-side surfaces 121 and 122 thereof being aspheric; and a plastic third lens element 130 with negative refractive power having a convex object-side surface 131 and a concave image-side surface 132, the object-side and image-side surfaces 131 and 132 thereof being aspheric, at least one inflection point formed on the object-side surface 131 and the image-side surface 132; wherein an aperture stop 100 is disposed between the first and second lens elements 110 and 120; wherein an IR filter 140 is disposed between the image-side surface 132 of the third lens element 130 and an image plane 160; and wherein the IR filter 140 is made of glass and has no influence on the focal length of the imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens assembly, the focal length of the imaging lens assembly is f, and it satisfies the relation: f=2.94 (mm).

In the first embodiment of the present imaging lens assembly, the f-number of the imaging lens assembly is Fno, and it satisfies the relation: Fno=2.85.

In the first embodiment of the present imaging lens assembly, half of the maximal field of view of the imaging lens assembly is HFOV, and it satisfies the relation: HFOV=30.9 deg.

In the first embodiment of the present imaging lens assembly, the Abbe number of the first lens element 110 is V1, the Abbe number of the second lens element 120 is V2, and they satisfy the relation: V1−V2=32.5.

In the first embodiment of the present imaging lens assembly, the radius of curvature of the object-side surface 111 of the first lens element 110 is R1, the radius of curvature of the image-side surface 112 of the first lens element 110 is R2, and they satisfy the relation: R1/R2=−0.01.

In the first embodiment of the present imaging lens assembly, the radius of curvature of the object-side surface 131 of the third lens element 130 is R5, the radius of curvature of the image-side surface 132 of the third lens element 130 is R6, and they satisfy the relation: R5/R6=1.21.

In the first embodiment of the present imaging lens assembly, the radius of curvature of the object-side surface 111 of the first lens element 110 is R1, the focal length of the imaging lens assembly is f, and they satisfy the relation: R1/f=0.41.

In the first embodiment of the present imaging lens assembly, the radius of curvature of the object-side surface 121 of the second lens element 121 is R3, the focal length of the imaging lens assembly is f, and they satisfy the relation: R3/f=−0.28.

In the first embodiment of the present imaging lens assembly, the focal length of the imaging lens assembly is f, the focal length of the first lens element 110 is f1, and they satisfy the relation: f/f1=1.35.

In the first embodiment of the present imaging lens assembly, the focal length of the imaging lens assembly is f, the focal length of the second lens element 120 is f2, and they satisfy the relation: f/f2=−0.38.

In the first embodiment of the present imaging lens assembly, the focal length of the second lens element 120 is f2, the focal length of the third lens element 130 is f3, and they satisfy the relation: f2/f3=0.19.

In the first embodiment of the present imaging lens assembly, the distance on the optical axis between the first lens element 110 and the second lens element 120 is T12, the focal length of the imaging lens assembly is f, and they satisfy the relation: (T12/f)*10=1.59.

In the first embodiment of the present imaging lens assembly, an electronic sensor is disposed at the image plane 160 for image formation. The distance on the optical axis between the aperture stop 100 and the electronic sensor is SL, the distance on the optical axis between the object-side surface 111 of the first lens element 110 and the electronic sensor is TTL, and they satisfy the relation: SL/TTL=0.84.

In the first embodiment of the present imaging lens assembly, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=1.94.

The detailed optical data of the first embodiment is shown in FIG. 13 (TABLE 1), and the aspheric surface data is shown in FIG. 14 (TABLE 2), wherein the units of the radius of curvature, the thickness and the focal length are expressed in mm, and HFOV is half of the maximal field of view.

Figure 3:
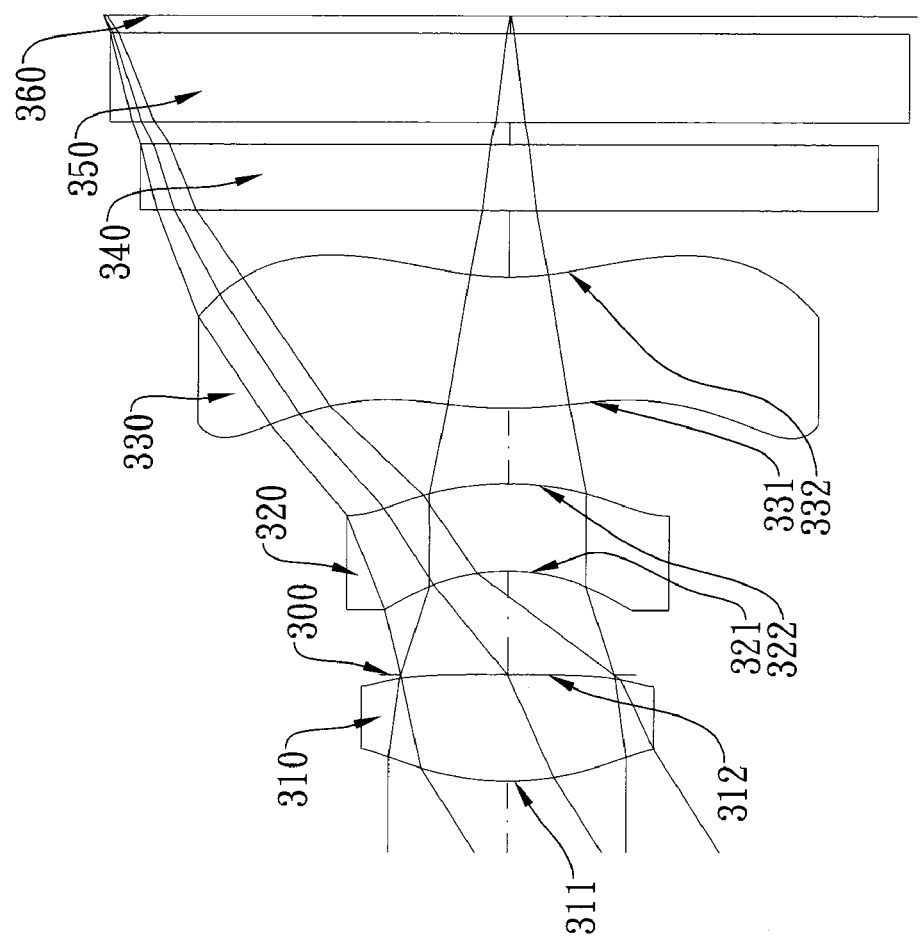
FIG. 3 shows an imaging lens assembly in accordance with a second embodiment of the present invention.
Figure 4:
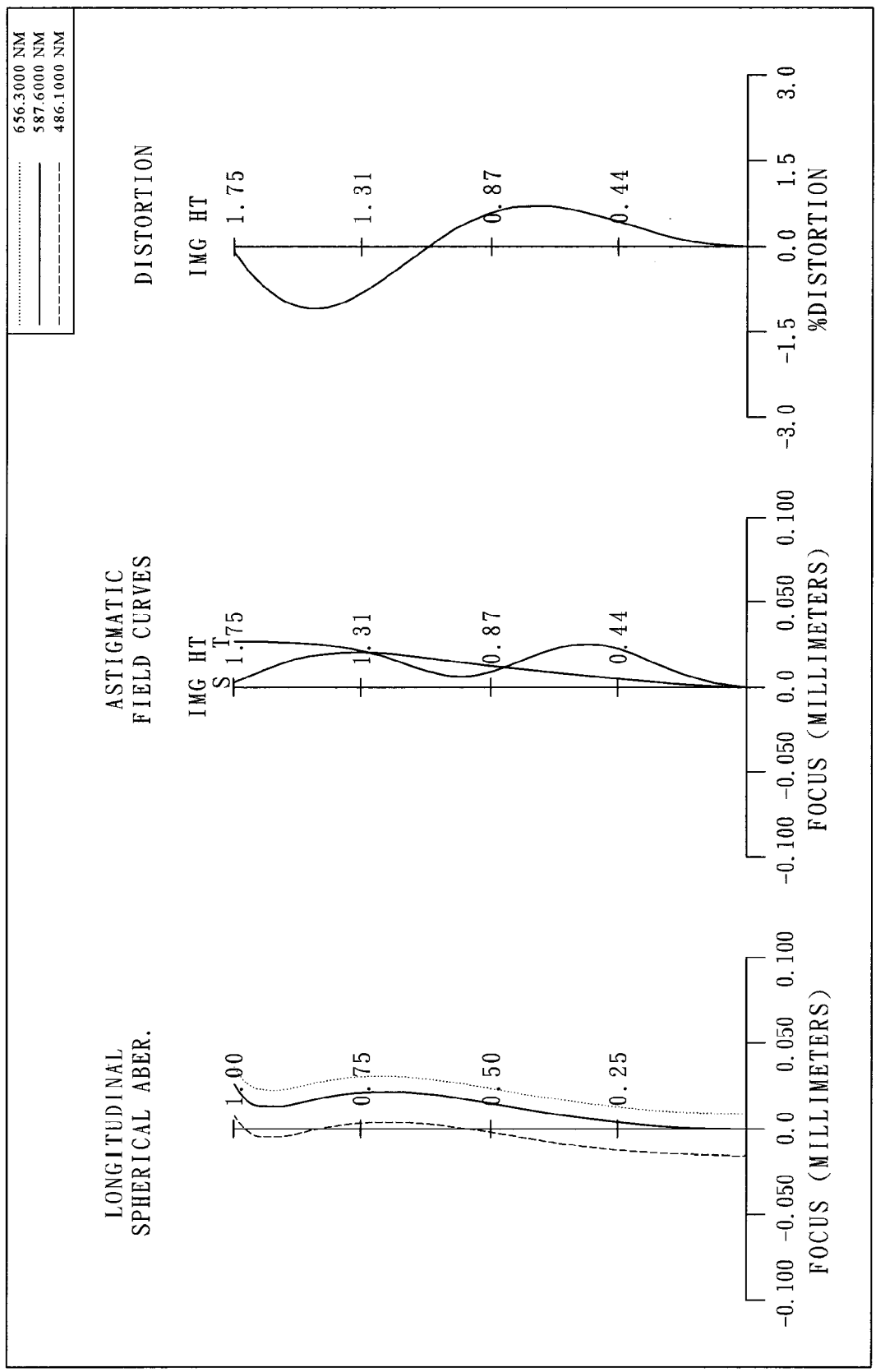
FIG. 4 shows the aberration curves of the second embodiment of the present invention.

FIG. 3 shows an imaging lens assembly in accordance with a second embodiment of the present invention, and FIG. 4 shows the aberration curves of the second embodiment of the present invention. The imaging lens assembly of the second embodiment of the present invention mainly comprises three lens elements, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a concave object-side surface 321 and a convex image-side surface 322, the object-side and image-side surfaces 321 and 322 thereof being aspheric; a plastic third lens element 330 with negative refractive power having a convex object-side surface 331 and a concave image-side surface 332, the object-side and image-side surfaces 331 and 332 thereof being aspheric, at least one inflection point formed on the object-side surface 331 and image-side surface 332; wherein an aperture stop 300 is disposed between the first and second lens elements 310 and 320; wherein an IR filter 340 and a cover glass 350 are disposed between the image-side surface 332 of the third lens element 330 and an image plane 360; and wherein the IR filter 340 and the cover glass 350 are made of glass and have no influence on the focal length of the imaging lens assembly.

The equation of the aspheric surface profiles of the second embodiment has the same form as that of the first embodiment.

In the second embodiment of the present imaging lens assembly, the focal length of the imaging lens assembly is f, and it satisfies the relation: f=2.90 (mm).

In the second embodiment of the present imaging lens assembly, the f-number of the imaging lens assembly is Fno, and it satisfies the relation: Fno=2.80.

In the second embodiment of the present imaging lens assembly, half of the maximal field of view of the imaging lens assembly is HFOV, and it satisfies the relation: HFOV=31.3 deg.

In the second embodiment of the present imaging lens assembly, the Abbe number of the first lens element 310 is V1, the Abbe number of the second lens element 320 is V2, and they satisfy the relation: V1−V2=34.5.

In the second embodiment of the present imaging lens assembly, the radius of curvature of the object-side surface 311 of the first lens element 310 is R1, the radius of curvature of the image-side surface 312 of the first lens element 310 is R2, and they satisfy the relation: R1/R2=−0.05.

In the second embodiment of the present imaging lens assembly, the radius of curvature of the object-side surface 331 of the third lens element 330 is R5, the radius of curvature of the image-side surface 332 of the third lens element 330 is R6, and they satisfy the relation: R5/R6=1.30.

In the second embodiment of the present imaging lens assembly, the radius of curvature of the object-side surface 311 of the first lens element 310 is R1, the focal length of the imaging lens assembly is f, and they satisfy the relation: R1/f=0.40.

In the second embodiment of the present imaging lens assembly, the radius of curvature of the object-side surface 321 of the second lens element 320 is R3, the focal length of the imaging lens assembly is f, and they satisfy the relation: R3/f=−0.30.

In the second embodiment of the present imaging lens assembly, the focal length of the imaging lens assembly is f, the focal length of the first lens element 310 is f1, and they satisfy the relation: f/f1=1.41.

In the second embodiment of the present imaging lens assembly, the focal length of the imaging lens assembly is f, the focal length of the second lens element 320 is f2, and they satisfy the relation: f/f2=−0.52.

In the second embodiment of the present imaging lens assembly, the focal length of the second lens element 320 is f2, the focal length of the third lens element 330 is f3, and they satisfy the relation: f2/f3=0.25.

In the second embodiment of the present imaging lens assembly, the distance on the optical axis between the first lens element 310 and the second lens element 320 is T12, the focal length of the imaging lens assembly is f, and they satisfy the relation: (T12/f)*10=1.61.

In the second embodiment of the present imaging lens assembly, an electronic sensor is disposed at the image plane 360 for image formation. The distance on the optical axis between the aperture stop 300 and the electronic sensor is SL, the distance on the optical axis between the object-side surface 311 of the first lens element 310 and the electronic sensor is TTL, and they satisfy the relation: SL/TTL=0.85.

In the second embodiment of the present imaging lens assembly, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=1.84.

The detailed optical data of the second embodiment is shown in FIG. 15 (TABLE 3), and the aspheric surface data is shown in FIG. 16 (TABLE 4), wherein the units of the radius of curvature, the thickness and the focal length are expressed in mm, and HFOV is half of the maximal field of view.

Figure 5:
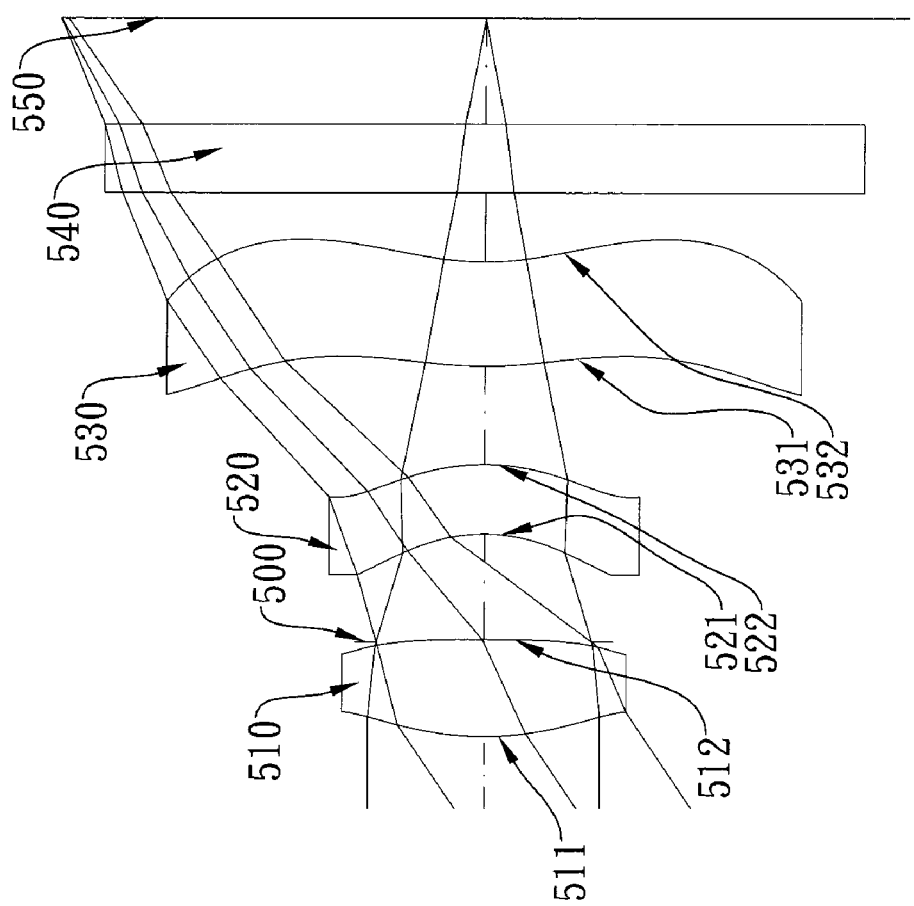
FIG. 5 shows an imaging lens assembly in accordance with a third embodiment of the present invention.
Figure 6:
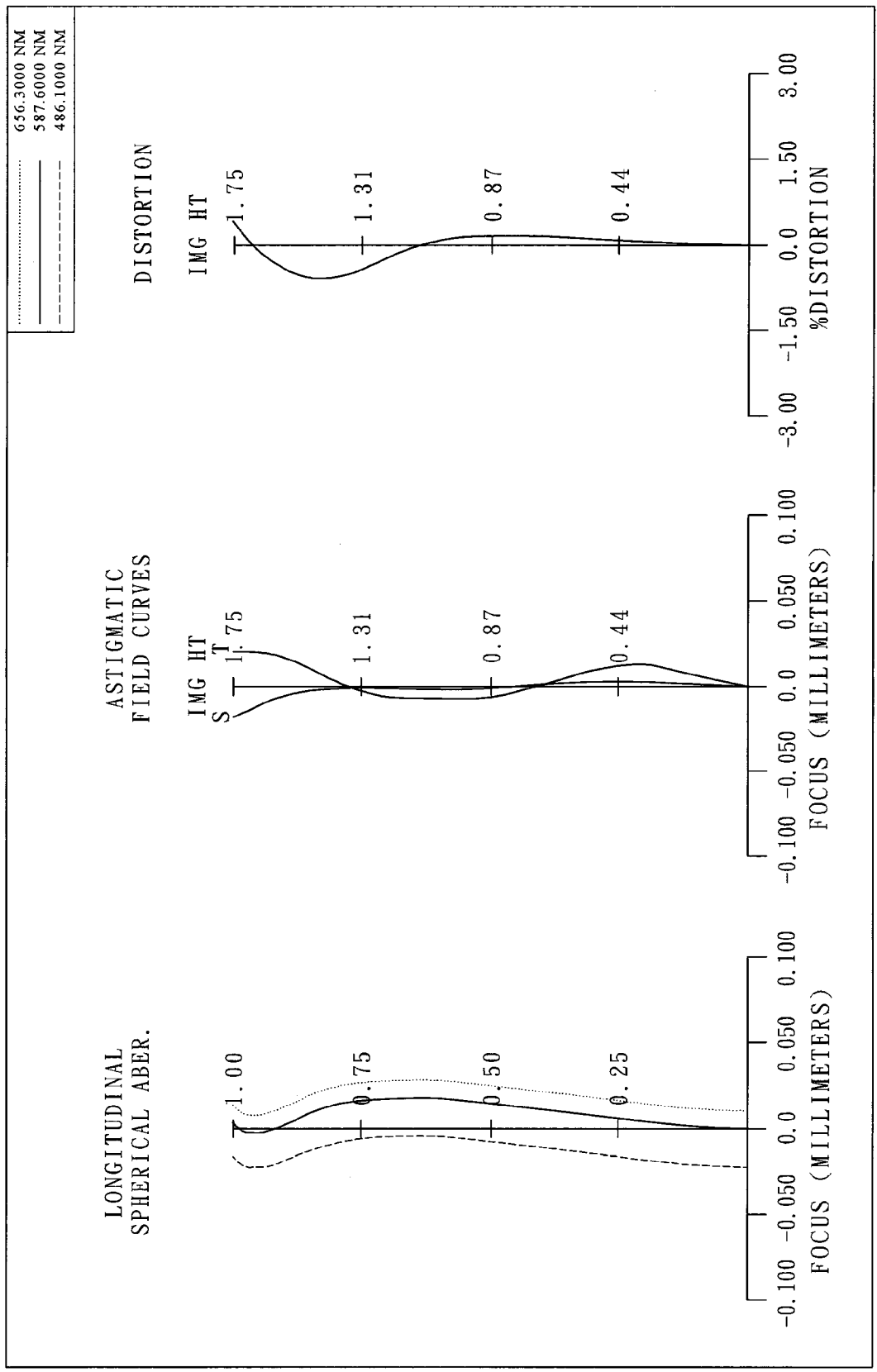
FIG. 6 shows the aberration curves of the third embodiment of the present invention.

FIG. 5 shows an imaging lens assembly in accordance with a third embodiment of the present invention, and FIG. 6 shows the aberration curves of the third embodiment of the present invention. The imaging lens assembly of the third embodiment of the present invention mainly comprises three lens elements, in order from the object side to the image side: a plastic first lens element 510 with positive refractive power having a convex object-side surface 511 and a convex image-side surface 512, the object-side and image-side surfaces 511 and 512 thereof being aspheric; a plastic second lens element 520 with negative refractive power having a concave object-side surface 521 and a convex image-side surface 522, the object-side and image-side surfaces 521 and 522 thereof being aspheric; a plastic third lens element 530 with negative refractive power having a convex object-side surface 531 and a concave image-side surface 532, the object-side and image-side surfaces 531 and 532 thereof being aspheric, at least one inflection point formed on the object-side surface 531 and image-side surface 532; wherein an aperture stop 500 is disposed between the first and second lens elements 510 and 520; wherein an IR filter 540 is disposed between the image-side surface 532 of the third lens element 530 and an image plane 550; and wherein the IR filter 540 is made of glass and has no influence on the focal length of the imaging lens assembly.

The equation of the aspheric surface profiles of the third embodiment has the same form as that of the first embodiment.

In the third embodiment of the present imaging lens assembly, the focal length of the imaging lens assembly is f, and it satisfies the relation: f=2.70 (mm).

In the third embodiment of the present imaging lens assembly, the f-number of the imaging lens assembly is Fno, and it satisfies the relation: Fno=2.80.

In the third embodiment of the present imaging lens assembly, half of the maximal field of view of the imaging lens assembly is HFOV, and it satisfies the relation: HFOV=32.9 deg.

In the third embodiment of the present imaging lens assembly, the Abbe number of the first lens element 510 is V1, the Abbe number of the second lens element 520 is V2, and they satisfy the relation: V1−V2=34.5.

In the third embodiment of the present imaging lens assembly, the radius of curvature of the object-side surface 511 of the first lens element 510 is R1, the radius of curvature of the image-side surface 512 of the first lens element 510 is R2, and they satisfy the relation: R1/R2=−0.13.

In the third embodiment of the present imaging lens assembly, the radius of curvature of the object-side surface 531 of the third lens element 530 is R5, the radius of curvature of the image-side surface 532 of the third lens element 530 is R6, and they satisfy the relation: R5/R6=1.41.

In the third embodiment of the present imaging lens assembly, the radius of curvature of the object-side surface 511 of the first lens element 510 is R1, the focal length of the imaging lens assembly is f, and they satisfy the relation: R1/f=0.45.

In the third embodiment of the present imaging lens assembly, the radius of curvature of the object-side surface 521 of the second lens element 520 is R3, the focal length of the imaging lens assembly is f, and they satisfy the relation: R3/f=−0.25.

In the third embodiment of the present imaging lens assembly, the focal length of the imaging lens assembly is f, the focal length of the first lens element 510 is f1, and they satisfy the relation: f/f1=1.34.

In the third embodiment of the present imaging lens assembly, the focal length of the imaging lens assembly is f, the focal length of the second lens element 520 is f2, and they satisfy the relation: f/f2=−0.26.

In the third embodiment of the present imaging lens assembly, the focal length of the second lens element 520 is f2, the focal length of the third lens element 530 is f3, and they satisfy the relation: f2/f3=0.99.

In the third embodiment of the present imaging lens assembly, the distance on the optical axis between the first lens element 510 and the second lens element 520 is T12, the focal length of the imaging lens assembly is f, and they satisfy the relation: (T12/f)*10=1.70.

In the third embodiment of the present imaging lens assembly, an electronic sensor is disposed at the image plane 550 for image formation. The distance on the optical axis between the aperture stop 500 and the electronic sensor is SL, the distance on the optical axis between the object-side surface 511 of the first lens element 510 and the electronic sensor is TTL, and they satisfy the relation: SL/TTL=0.86.

In the third embodiment of the present imaging lens assembly, the distance on the optical axis between the object-side surface 511 of the first lens element 510 and the electronic sensor is TTL, half of the diagonal length of the effective pixel area of the electronic sensor is ImgH, and they satisfy the relation: TTL/ImgH=1.73.

The detailed optical data of the third embodiment is shown in FIG. 17 (TABLE 5), and the aspheric surface data is shown in FIG. 18 (TABLE 6), wherein the units of the radius of curvature, the thickness and the focal length are expressed in mm, and HFOV is half of the maximal field of view.

Figure 7:
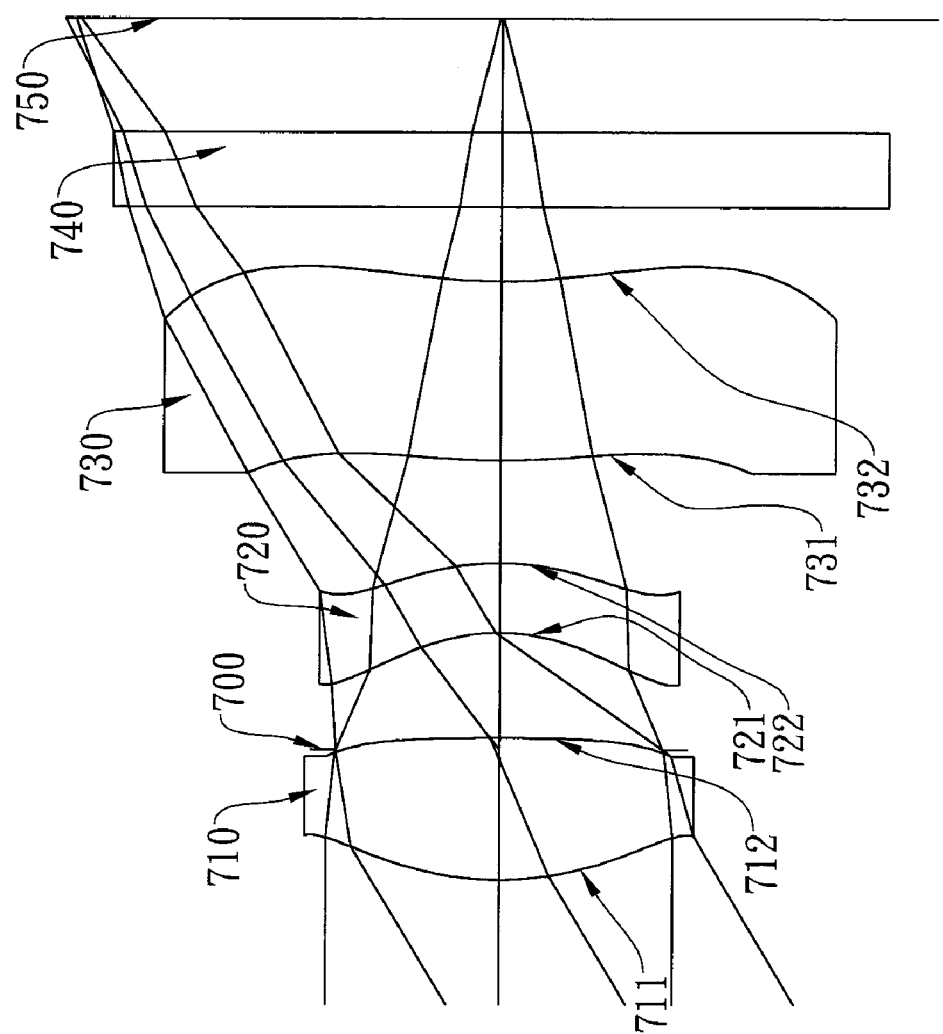
FIG. 7 shows an imaging lens assembly in accordance with a fourth embodiment of the present invention.
Figure 8:
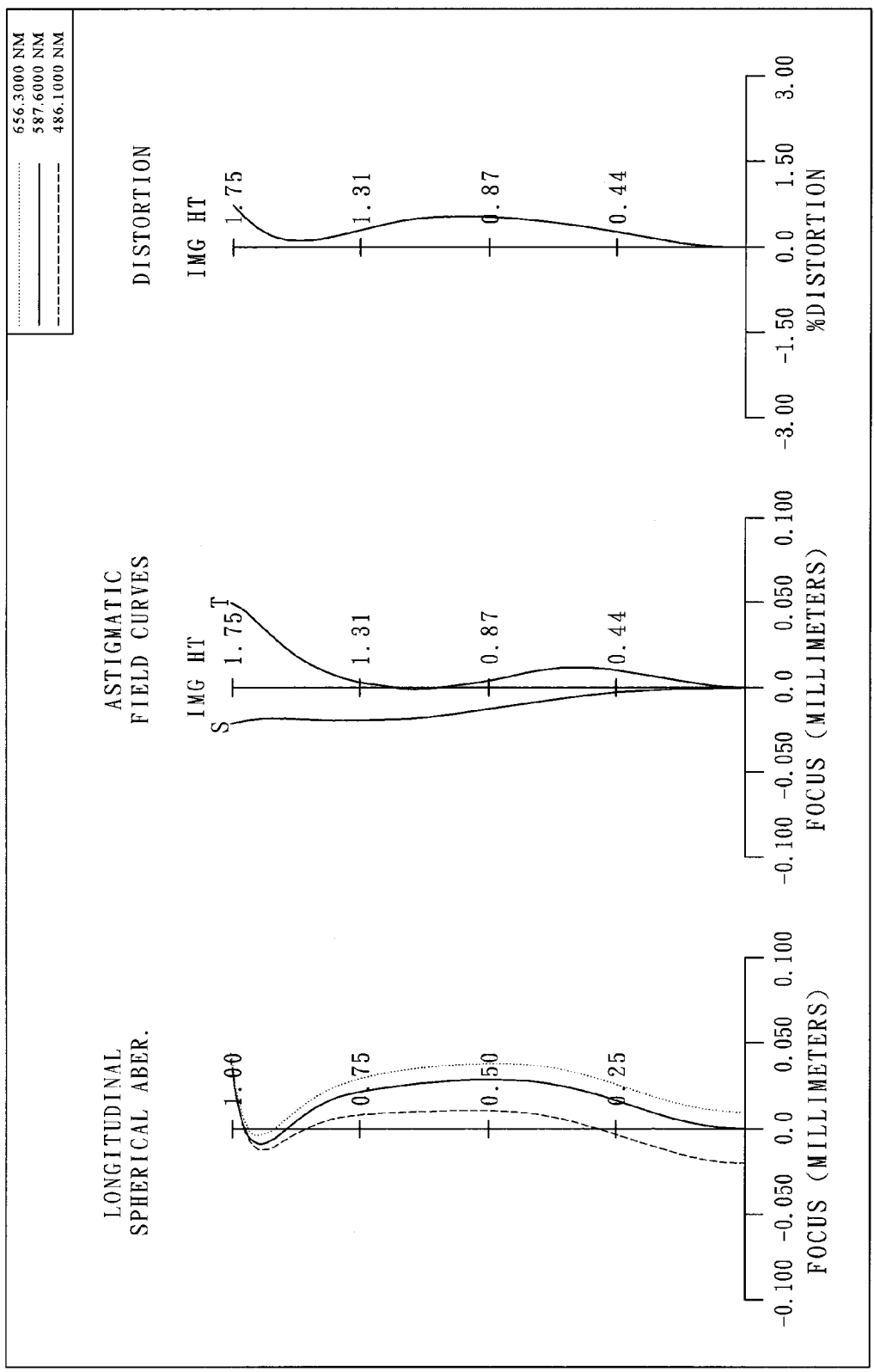
FIG. 8 shows the aberration curves of the fourth embodiment of the present invention.

FIG. 7 shows an imaging lens assembly in accordance with a fourth embodiment of the present invention, and FIG. 8 shows the aberration curves of the fourth embodiment of the present invention. The imaging lens assembly of the fourth embodiment of the present invention mainly comprises three lens elements, in order from the object side to the image side: a plastic first lens element 710 with positive refractive power having a convex object-side surface 711 and a convex image-side surface 712, the object-side and image-side surfaces 711 and 712 thereof being aspheric; a plastic second lens element 720 with negative refractive power having a concave object-side surface 721 and a convex image-side surface 722, the object-side and image-side surfaces 721 and 722 thereof being aspheric; and a plastic third lens element 730 with negative refractive power having a convex object-side surface 731 and a concave image-side surface 732, the object-side and image-side surfaces 731 and 732 thereof being aspheric, at least one inflection point formed on the object-side surface 731 and the image-side surface 732; wherein an aperture stop 700 is disposed between the first and second lens elements 710 and 720; wherein an IR filter 740 is disposed between the image-side surface 732 of the third lens element 730 and an image plane 750; and wherein the IR filter 740 is made of glass and has no influence on the focal length of the imaging lens assembly.

The equation of the aspheric surface profiles of the fourth embodiment has the same form as that of the first embodiment.

In the fourth embodiment of the present imaging lens assembly, the focal length of the imaging lens assembly is f, and it satisfies the relation: f=2.90 (mm).

In the fourth embodiment of the present imaging lens assembly, the f-number of the imaging lens assembly is Fno, and it satisfies the relation: Fno=2.07.

In the fourth embodiment of the present imaging lens assembly, half of the maximal field of view of the imaging lens assembly is HFOV, and it satisfies the relation: HFOV=31.0 deg.

In the fourth embodiment of the present imaging lens assembly, the Abbe number of the first lens element 710 is V1, the Abbe number of the second lens element 720 is V2, and they satisfy the relation: V1−V2=34.5.

In the fourth embodiment of the present imaging lens assembly, the radius of curvature of the object-side surface 711 of the first lens element 710 is R1, the radius of curvature of the image-side surface 712 of the first lens element 710 is R2, and they satisfy the relation: R1/R2=−0.07.

In the fourth embodiment of the present imaging lens assembly, the radius of curvature of the object-side surface 731 of the third lens element 730 is R5, the radius of curvature of the image-side surface 732 of the third lens element 730 is R6, and they satisfy the relation: R5/R6=1.31.

In the fourth embodiment of the present imaging lens assembly, the radius of curvature of the object-side surface 711 of the first lens element 710 is R1, the focal length of the imaging lens assembly is f, and they satisfy the relation: R1/f=0.44.

In the fourth embodiment of the present imaging lens assembly, the radius of curvature of the object-side surface 721 of the second lens element 720 is R3, the focal length of the imaging lens assembly is f, and they satisfy the relation: R3/f=−0.28.

In the fourth embodiment of the present imaging lens assembly, the focal length of the imaging lens assembly is f, the focal length of the first lens element 710 is f1, and they satisfy the relation: f/f1=1.32.

In the fourth embodiment of the present imaging lens assembly, the focal length of the imaging lens assembly is f, the focal length of the second lens element 720 is f2, and they satisfy the relation: f/f2=−0.36.

In the fourth embodiment of the present imaging lens assembly, the focal length of the second lens element 720 is f2, the focal length of the third lens element 730 is f3, and they satisfy the relation: f2/f3=0.31.

In the fourth embodiment of the present imaging lens assembly, the distance on the optical axis between the first lens element 710 and the second lens element 720 is T12, the focal length of the imaging lens assembly is f, and they satisfy the relation: (T12/f)*10=1.46.

In the fourth embodiment of the present imaging lens assembly, an electronic sensor is disposed at the image plane 750 for image formation. The distance on the optical axis between the aperture stop 700 and the electronic sensor is SL, the distance on the optical axis between the object-side surface 711 of the first lens element 710 and the electronic sensor is TTL, and they satisfy the relation: SL/TTL=0.85.

In the fourth embodiment of the present imaging lens assembly, the distance on the optical axis between the object-side surface 711 of the first lens element 710 and the electronic sensor is TTL, half of the diagonal length of the effective pixel area of the electronic sensor is ImgH, and they satisfy the relation: TTL/ImgH=1.92.

The detailed optical data of the fourth embodiment is shown in FIG. 19 (TABLE 7), and the aspheric surface data is shown in FIG. 20 (TABLE 8), wherein the units of the radius of curvature, the thickness and the focal length are expressed in mm, and HFOV is half of the maximal field of view.

Figure 9:
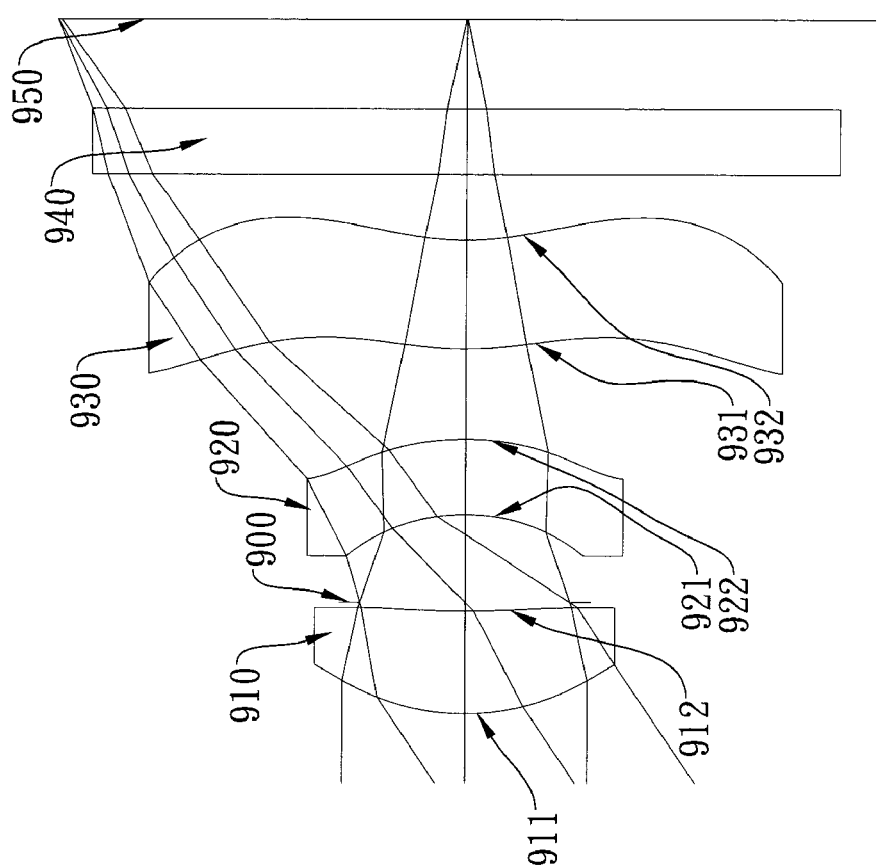
FIG. 9 shows an imaging lens assembly in accordance with a fifth embodiment of the present invention.
Figure 10:
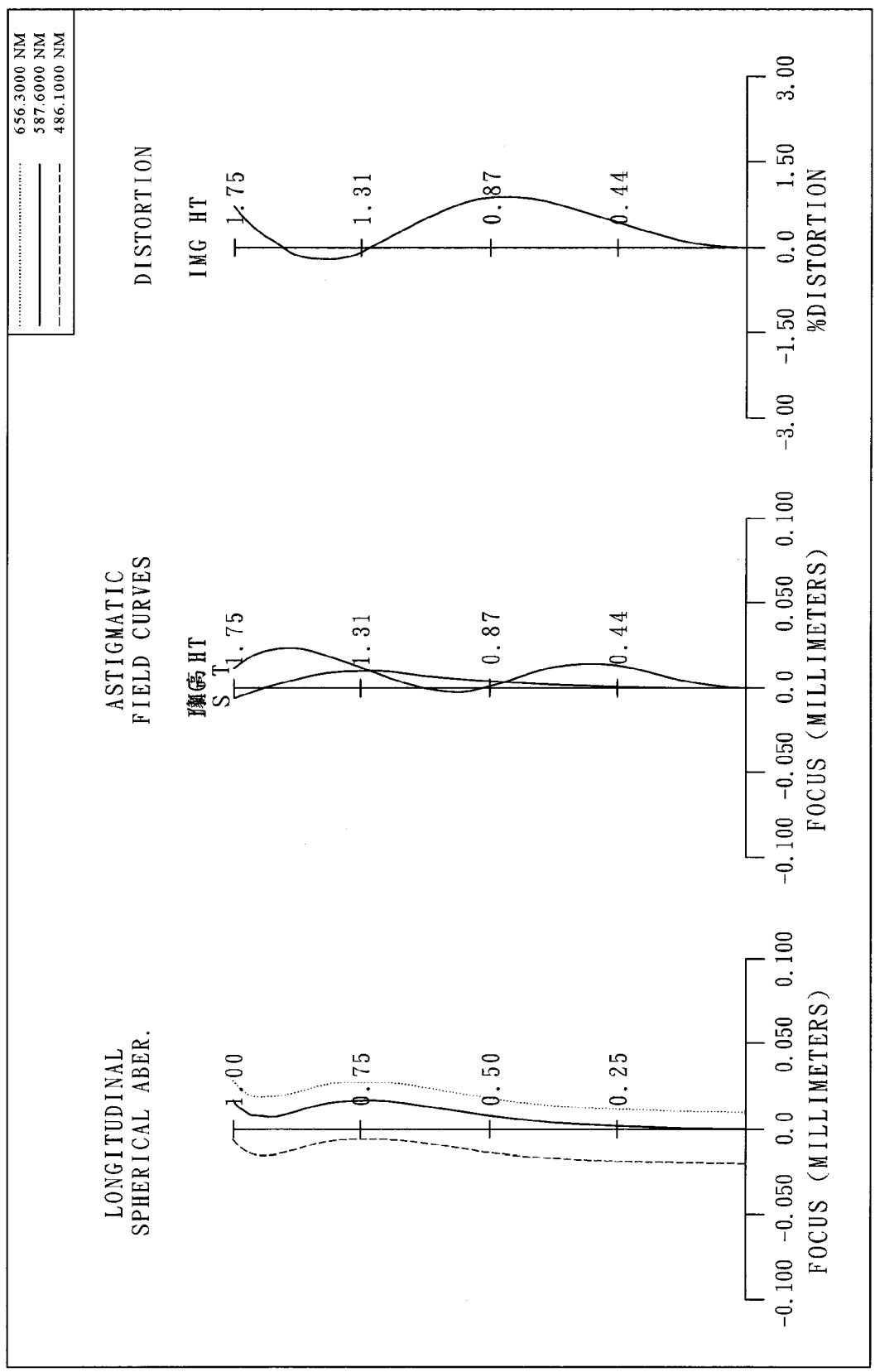
FIG. 10 shows the aberration curves of the fifth embodiment of the present invention.

FIG. 9 shows an imaging lens assembly in accordance with a fifth embodiment of the present invention, and FIG. 10 shows the aberration curves of the fifth embodiment of the present invention. The imaging lens assembly of the fifth embodiment of the present invention mainly comprises three lens elements, in order from the object side to the image side: a plastic first lens element 910 with positive refractive power having a convex object-side surface 911 and a concave image-side surface 912, the object-side and image-side surfaces 911 and 912 thereof being aspheric; a plastic second lens element 920 with negative refractive power having a concave object-side surface 921 and a convex image-side surface 922, the object-side and image-side surfaces 921 and 922 thereof being aspheric; and a plastic third lens element 930 with negative refractive power having a convex object-side surface 931 and a concave image-side surface 932, the object-side and image-side surfaces 931 and 932 thereof being aspheric, at least one infection point formed on the object-side surface 931 and the image-side surface 932; wherein an aperture stop 900 is disposed between the first lens element 910 and the second lens element 920; wherein an IR filter 940 is disposed between the image-side surface 932 of the third lens element 930 and an image plane 950; and wherein the IR filter 940 is made of glass and has no influence on the focal length of the imaging lens assembly.

The equation of the aspheric surface profiles of the fifth embodiment has the same form as that of the first embodiment.

In the fifth embodiment of the present imaging lens assembly, the focal length of the imaging lens assembly is f, and it satisfies the relation: f=2.74 (mm).

In the fifth embodiment of the present imaging lens assembly, the f-number of the imaging lens assembly is Fno, and it satisfies the relation: Fno=2.60.

In the fifth embodiment of the present imaging lens assembly, half of the maximal field of view of the imaging lens assembly is HFOV, and it satisfies the relation: HFOV=32.5 deg.

In the fifth embodiment of the present imaging lens assembly, the Abbe number of the first lens element 910 is V1, the Abbe number of the second lens element 920 is V2, and they satisfy the relation: V1−V2=34.5.

In the fifth embodiment of the present imaging lens assembly, the radius of curvature of the object-side surface 911 of the first lens element 910 is R1, the radius of curvature of the image-side surface 912 of the first lens element 910 is R2, and they satisfy the relation: R1/R2=0.22.

In the fifth embodiment of the present imaging lens assembly, the radius of curvature of the object-side surface 931 of the third lens element 930 is R5, the radius of curvature of the image-side surface 932 of the third lens element 930 is R6, and they satisfy the relation: R5/R6=1.20.

In the fifth embodiment of the present imaging lens assembly, the radius of curvature of the object-side surface 911 of the first lens element 910 is R1, the focal length of the imaging lens assembly is f, and they satisfy the relation: R1/f=0.35.

In the fifth embodiment of the present imaging lens assembly, the radius of curvature of the object-side surface 921 of the second lens element 920 is R3, the focal length of the imaging lens assembly is f, and they satisfy the relation: R3/f=−0.30.

In the fifth embodiment of the present imaging lens assembly, the focal length of the imaging lens assembly is f, the focal length of the first lens element 910 is f1, and they satisfy the relation: f/f1=1.26.

In the fifth embodiment of the present imaging lens assembly, the focal length of the imaging lens assembly is f, the focal length of the second lens element 920 is f2, and they satisfy the relation: f/f2=−0.35.

In the fifth embodiment of the present imaging lens assembly, the focal length of the second lens element 920 is f2, the focal length of the third lens element 930 is f3, and they satisfy the relation: f2/f3=0.14.

In the fifth embodiment of the present imaging lens assembly, the distance on the optical axis between the first lens element 910 and the second lens element 920 is T12, the focal length of the imaging lens assembly is f, and they satisfy the relation: (T12/f)*10=1.61.

In the fifth embodiment of the present imaging lens assembly, an electronic sensor is disposed at the image plane 950 for image formation. The distance on the optical axis between the aperture stop 900 and the electronic sensor is SL, the distance on the optical axis between the object-side surface 911 of the first lens element 910 and the electronic sensor is TTL, and they satisfy the relation: SL/TTL=0.83.

In the fifth embodiment of the present imaging lens assembly, the distance on the optical axis between the object-side surface 911 of the first lens element 910 and the electronic sensor is TTL, half of the diagonal length of the effective pixel area of the electronic sensor is ImgH, and they satisfy the relation: TTL/ImgH=1.75.

The detailed optical data of the fifth embodiment is shown in FIG. 21 (TABLE 9), and the aspheric surface data is shown in FIG. 22 (TABLE 10), wherein the units of the radius of curvature, the thickness and the focal length are expressed in mm, and HFOV is half of the maximal field of view.

Figure 11:
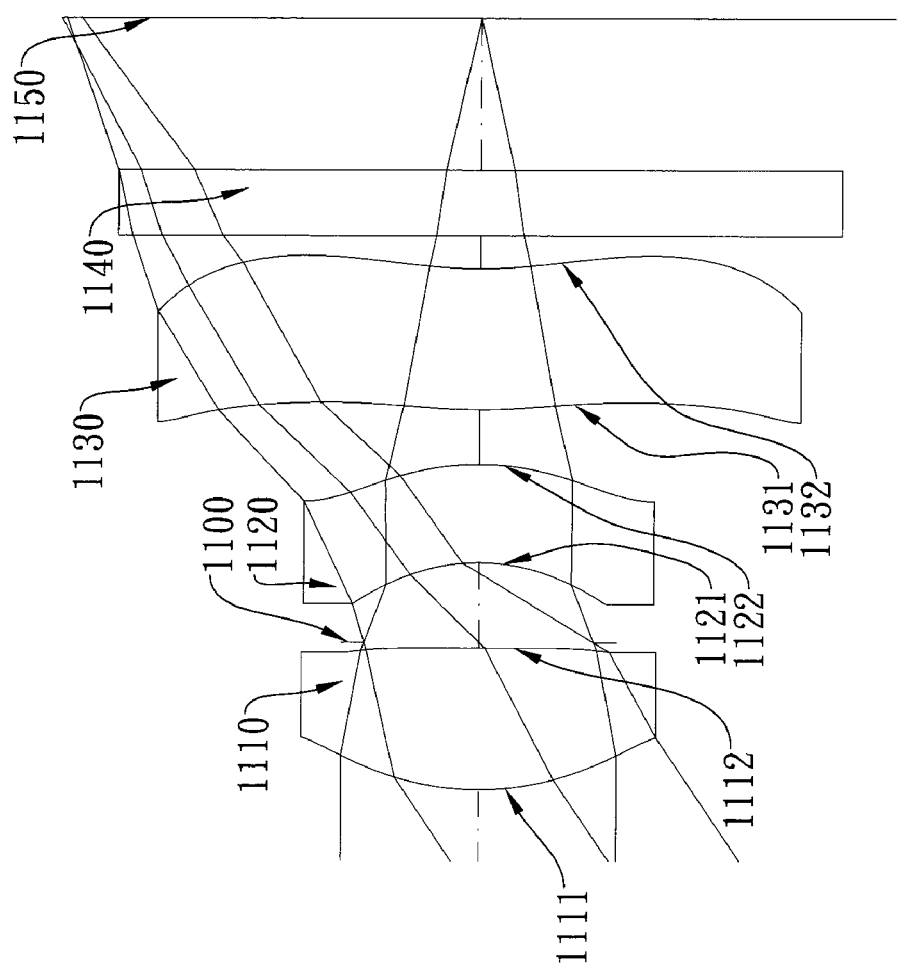
FIG. 11 shows an imaging lens assembly in accordance with a sixth embodiment of the present invention.
Figure 12:
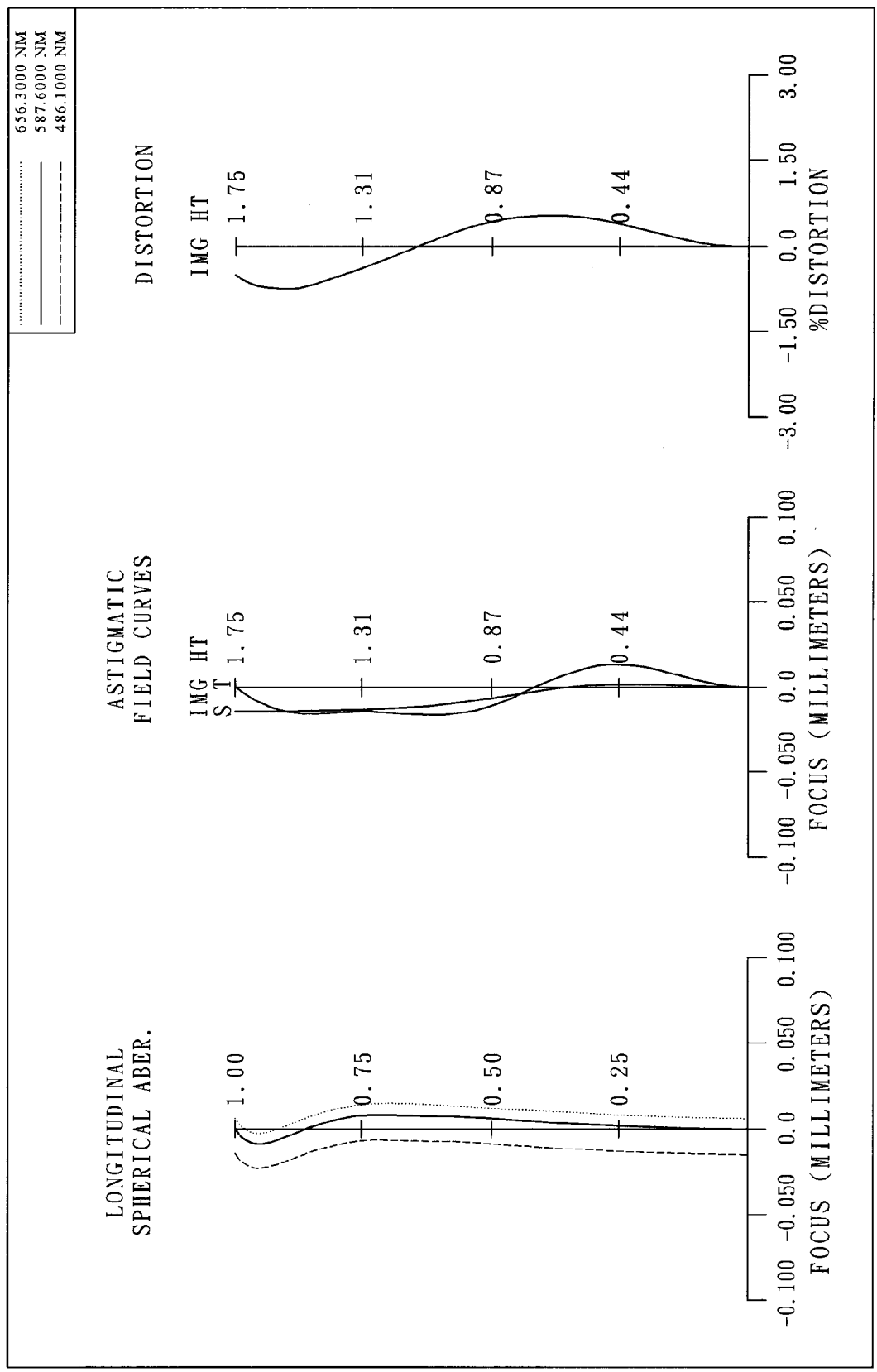
FIG. 12 shows the aberration curves of the sixth embodiment of the present invention.

FIG. 11 shows an imaging lens assembly in accordance with a sixth embodiment of the present invention, and FIG. 12 shows the aberration curves of the sixth embodiment of the present invention. The imaging lens assembly of the sixth embodiment of the present invention mainly comprises third lens elements, in order from the object side to the image side: a plastic first lens element 1110 with positive refractive power having a convex object-side surface 1111 and a concave image-side surface 1112, the object-side and image-side surfaces 1111 and 1112 thereof being aspheric; a plastic second lens element 1120 with negative refractive power having a concave object-side surface 1121 and a convex image-side surface 1122, the object-side and image-side surfaces 1121 and 1122 thereof being aspheric; a plastic third lens element 1130 with negative refractive power having a convex object-side surface 1131 and a concave image-side surface 1132, the object-side and image-side surfaces 1131 and 1132 thereof being aspheric, at least one inflection point is formed on the object-side surface 1131 and the image-side surface 1132; wherein an aperture stop 1100 is disposed between the first lens element 1110 and the second lens elements 1120; wherein an IR filter 1140 is disposed between the image-side surface 1132 of the third lens element 1130 and an image plane 1150; and wherein the IR filter 1140 is made of glass and has no influence on the focal length of the imaging lens assembly.

The equation of the aspheric surface profiles of the sixth embodiment has the same form as that of the first embodiment.

In the sixth embodiment of the present imaging lens assembly, the focal length of the imaging lens assembly is f, and it satisfies the relation: f=1.90 (mm).

In the sixth embodiment of the present imaging lens assembly, the f-number of the imaging lens assembly is Fno, and it satisfies the relation: Fno=2.40.

In the sixth embodiment of the present imaging lens assembly, half of the maximal field of view of the imaging lens assembly is HFOV, and it satisfies the relation: HFOV=32.5 deg.

In the sixth embodiment of the present imaging lens assembly, the Abbe number of the first lens element 1110 is V1, the Abbe number of the second lens element 1120 is V2, and they satisfy the relation: V1−V2=32.5.

In the sixth embodiment of the present imaging lens assembly, the radius of curvature of the object-side surface 1111 of the first lens element 1110 is R1, the radius of curvature of the image-side surface 1112 of the first lens element 1110 is R2, and they satisfy the relation: R1/R2=0.03.

In the sixth embodiment of the present imaging lens assembly, the radius of curvature of the object-side surface 1131 of the third lens element 1130 is R5, the radius of curvature of the image-side surface 1132 of the third lens element 1130 is R6, and they satisfy the relation: R5/R6=1.19.

In the sixth embodiment of the present imaging lens assembly, the radius of curvature of the object-side surface 1111 of the first lens element 1110 is R1, the focal length of the imaging lens assembly is f, and they satisfy the relation: R1/f=0.41.

In the sixth embodiment of the present imaging lens assembly, the radius of curvature of the object-side surface 1121 of the second lens element 1120 is R3, the focal length of the imaging lens assembly is f, and they satisfy the relation: R3/f=−0.28.

In the sixth embodiment of the present imaging lens assembly, the focal length of the imaging lens assembly is f, the focal length of the first lens element 1110 is f1, and they satisfy the relation: f/f1=1.30.

In the sixth embodiment of the present imaging lens assembly, the focal length of the imaging lens assembly is f, the focal length of the second lens element 1120 is f2, and they satisfy the relation: f/f2=−0.28.

In the sixth embodiment of the present imaging lens assembly, the focal length of the second lens element 1120 is f2, the focal length of the third lens element 1130 is f3, and they satisfy the relation: f2/f3=0.18.

In the sixth embodiment of the present imaging lens assembly, the distance on the optical axis between the first lens element 1110 and the second lens element 1120 is T12, the focal length of the imaging lens assembly is f, and they satisfy the relation: (T12/f)*10=1.37.

In the sixth embodiment of the present imaging lens assembly, an electronic sensor is disposed at the image plane 1150 for image formation. The distance on the optical axis between the aperture stop 1100 and the electronic sensor is SL, the distance on the optical axis between the object-side surface 1111 of the first lens element 1110 and the electronic sensor is TTL, and they satisfy the relation: SL/TTL=0.80.

In the sixth embodiment of the present imaging lens assembly, the distance on the optical axis between the object-side surface 1111 of the first lens element 1110 and the electronic sensor is TTL, half of the diagonal length of the effective pixel area of the electronic sensor is ImgH, and they satisfy the relation: TTL/ImgH=1.90.

The detailed optical data of the sixth embodiment is shown in FIG. 23 (TABLE 11), and the aspheric surface data is shown in FIG. 24 (TABLE 12), wherein the units of the radius of curvature, the thickness and the focal length are expressed in mm, and HFOV is half of the maximal field of view.

It is to be noted that TABLES 1-12 (illustrated in FIGS. 13-24 respectively) show different data of the different embodiments, however, the data of the different embodiments are obtained from experiments. Therefore, any imaging lens assembly of the same structure is considered to be within the scope of the present invention even if it uses different data. The embodiments depicted above and the appended drawings are exemplary and are not intended to limit the claim scope of the present invention. TABLE 13 (illustrated in FIG. 25) shows the data of the respective embodiments resulting from the equations.

What is claimed is:

1. An imaging lens assembly comprising, in order from an object side to an image side:
   a first lens element with positive refractive power having a convex object-side surface and a convex image-side surface;
   a second lens element with negative refractive power, at least one of the object-side and image-side surfaces thereof being aspheric; and
   a third lens element with negative refractive power having a concave image-side surface, both of the object-side and image-side surfaces thereof being aspheric; and
   wherein the imaging lens assembly further comprises an aperture stop disposed between the first lens element and the second lens element, and an electronic sensor for image formation; wherein there are three lens elements with refractive power; and wherein a focal length of the imaging lens assembly is f, a focal length of the second lens element is f2, a radius of curvature of the object-side surface of the first lens element is R1, a radius of curvature of the image-side surface of the first lens element is R2, a radius of curvature of the object-side surface of the second lens element is R3, a distance on the optical axis between the aperture stop and the electronic sensor is SL, a distance on the optical axis between the object-side surface of the first lens element and the electronic sensor is TTL, and they satisfy the following relations:

$-0.70 < f/f2 < -0.24$;

$-0.30 < R1/R2 < 0.00$;

$-0.40 < R3/f < -0.24$;

$0.75 < SL/TTL < 0.90$.

2. The imaging lens assembly according to claim 1, wherein the second lens element has a concave object-side surface and a convex image-side surface, is made of plastic material, and has at least one inflection point formed on the object-side and image-side surfaces.

3. The imaging lens assembly according to claim 2, wherein the focal length of the imaging lens assembly is f, the focal length of the first lens element is f1, and they satisfy the relation: $1.10 < f/f1 < 1.48$.

4. The imaging lens assembly according to claim 3, wherein an Abbe number of the first lens element is V1, an Abbe number of the second lens element is V2, and they satisfy the relation: $31.0 < V1 - V2 < 45.0$.

5. The imaging lens assembly according to claim 3, wherein radius of curvature of the object-side surface of the first lens element is R1, the focal length of the imaging lens assembly is f, and they satisfy the relation: $0.30 < R1/f < 0.50$.

6. The imaging lens assembly according to claim 3, wherein the focal length of the second lens element is f2, the focal length of the third lens element is f3, and they satisfy the relation: $0.08 < f2/f3 < 0.40$.

7. The imaging lens assembly according to claim 2, wherein the radius of curvature of the object-side surface of the first lens element is R1, the radius of curvature of the image-side surface of the first lens element is R2, and they satisfy the relation: $-0.15 < R1/R2 < 0.00$.

8. The imaging lens assembly according to claim 2, wherein radius of curvature of the object-side surface of the third lens element is R5, the radius of curvature of the image-side surface of the third lens element is R6, and they satisfy the relation: $1.10 < R5/R6 < 1.60$.

9. The imaging lens assembly according to claim 2, wherein a distance on the optical axis between the first lens element and the second lens element is T12, the focal length of the imaging lens assembly is f, and they satisfy the relation: $1.35 < (T12/f)*10 < 1.85$.

10. The imaging lens assembly according to claim 2, wherein the distance on the optical axis between the object-side surface of the first lens element and the electronic sensor is TTL, half of the diagonal length of the effective pixel area of the electronic sensor is ImgH, and they satisfy the relation: $TTL/ImgH < 2.0$.

11. The imaging lens assembly according to claim 1, wherein the focal length of the imaging lens assembly is f, the focal length of the second lens element is f2, and they satisfy the relation: $-0.45 < f/f2 < -0.29$.

12. An imaging lens assembly comprising, in order from an object side to an image side:
    a first lens element with positive refractive power having a convex object-side surface and a convex image-side surface;
    a second lens element with negative refractive power having a concave object-side surface and a convex image-side surface, at least one of the object-side and the image-side surfaces thereof being aspheric; and
    a third lens element with negative refractive power having a concave image-side surface, both of the object-side and image-side surfaces thereof being aspheric, at least one inflection point formed on the object-side and image-side surfaces; and wherein the imaging lens assembly further comprises an aperture stop disposed between the first lens element and the second lens element, and an electronic sensor for image formation; wherein there are three lens elements with refractive power; and wherein a focal length of the imaging lens assembly is f, a focal length of the first lens element is f1, a focal length of the second lens element is f2, a distance on the optical axis between the aperture stop and the electronic sensor is SL, a distance on the optical axis between the object-side surface of the first lens element and the electronic sensor is TTL, and they satisfy the following relations:

$-0.45 < f/f2 < -0.29$;

$1.10 < f/f1 < 1.48$;

$0.75 < SL/TTL < 0.90$.

13. The imaging lens assembly according to claim 12, wherein the radius of curvature of the object-side surface of the first lens element is R1, the radius of curvature of the image-side surface of the first lens element is R2, and they satisfy the relation: $-0.30<R1/R2<0.00$.

14. The imaging lens assembly according to claim 13, wherein the radius of curvature of the object-side surface of the first lens element is R1, the radius of curvature of the image-side surface of the first lens element is R2, and they satisfy the relation: $-0.15<R1/R2<0.00$.

15. The imaging lens assembly according to claim 14, wherein the focal length of the second lens element is f2, the focal length of the third lens element is f3, and they satisfy the relation: $0.08<f2/f3<0.40$.

16. The imaging lens assembly according to claim 12, wherein the Abbe number of the first lens element is V1, the Abbe number of the second lens element is V2, and they satisfy the relation: $31.0<V1-V2<45.0$.

17. The imaging lens assembly according to claim 16, wherein the Abbe number of the first lens element is V1, the Abbe number of the second lens element is V2, and they satisfy the relation: $33.5<V1-V2<45.0$.

18. The imaging lens assembly according to claim 16, wherein a distance on the optical axis between the first lens element and the second lens element is T12, the focal length of the imaging lens assembly is f, and they satisfy the relation: $1.35<(T12/f)*10<1.85$.

19. The imaging lens assembly according to claim 18, wherein radius of curvature of the object-side surface of the first lens element is R1, the focal length of the imaging lens assembly is f, and they satisfy the relation: $0.30<R1/f<0.50$.

20. An imaging lens assembly comprising, in order from an object side to an image side:
  a first lens element with positive refractive power having a convex object-side surface and a convex image-side surface;
  a second lens element with negative refractive power having a concave object-side surface and a convex image-side surface, at least one of the object-side and the image-side surfaces thereof being aspheric; and
  a third lens element with negative refractive power having a concave image-side surface, both of the object-side and image-side surfaces thereof being aspheric, at least one inflection point formed on the object-side and image-side surfaces; and wherein the imaging lens assembly further comprises an aperture stop disposed between the first lens element and the second lens element, and an electronic sensor for image formation; wherein there are three lens elements with refractive power; and wherein a focal length of the imaging lens assembly is f, a focal length of the second lens element is f2, a radius of curvature of the object-side surface of the first lens element is R1, a radius of curvature of the image-side surface of the first lens element is R2, an Abbe number of the first lens element is V1, an Abbe number of the second lens element is V2, a distance on the optical axis between the aperture stop and the electronic sensor is SL, a distance on the optical axis between the object-side surface of the first lens element and the electronic sensor is TTL, and they satisfy the following relations:

$$-0.70<f/f2<-0.24;$$

$$-0.30<R1/R2<0.00;$$

$$31.0<V1-V2<45.0;$$

$$0.75<SL/TTL<0.90.$$

21. The imaging lens assembly according to claim 20, wherein the focal length of the imaging lens assembly is f, the focal length of the second lens element is f2, and they satisfy the relation: $-0.45<f/f2<-0.29$.

22. The imaging lens assembly according to claim 20, wherein the first lens element, the second lens element, and the third lens element are made of plastic material, a distance on the optical axis between the first lens element and the second lens element is T12, the focal length of the imaging lens assembly is f, and they satisfy the relation: $1.35<(T12/f)*10<1.85$.

23. The imaging lens assembly according to claim 22, wherein the Abbe number of the first lens element is V1, the Abbe number of the second lens element is V2, and they satisfy the relation: $33.5<V1-V2<45.0$.

* * * * *